(12) United States Patent
Hane et al.

(10) Patent No.: US 7,308,229 B2
(45) Date of Patent: Dec. 11, 2007

(54) SYSTEM, APPARATUS AND METHOD FOR SINGLE-CHANNEL OR MULTI-CHANNEL TERRESTRIAL COMMUNICATION

(75) Inventors: John Hane, Bethesda, MD (US); Richard G. Gould, Washington, DC (US)

(73) Assignee: Xanadoo Company, Bala Cynwyd, PA (US)

( * ) Notice: Subject to any disclaimer, the term of this patent is extended or adjusted under 35 U.S.C. 154(b) by 729 days.

(21) Appl. No.: 09/790,543

(22) Filed: Feb. 23, 2001

(65) Prior Publication Data

US 2002/0160708 A1 Oct. 31, 2002

(51) Int. Cl.
*H04H 1/00* (2006.01)

(52) U.S. Cl. .................. 455/3.02; 455/12.1; 455/63.1; 455/114.2

(58) Field of Classification Search ...... 455/3.01–3.03, 455/427, 12.1, 63.1, 272, 15, 25, 39, 63.4, 455/67.11, 430, 114.2, 562.1, 447, 3.06, 179.1, 455/188.1; 725/63, 67, 68; 343/878–879, 343/893, 840
See application file for complete search history.

(56) References Cited

U.S. PATENT DOCUMENTS

| | | | | |
|---|---|---|---|---|
| 4,888,596 | A | * | 12/1989 | Conanan ..................... 343/703 |
| 4,939,789 | A | | 7/1990 | Sakashita et al. |
| 5,038,150 | A | * | 8/1991 | Bains .......................... 342/373 |
| 5,437,052 | A | * | 7/1995 | Hemmie et al. .............. 725/73 |
| 5,483,663 | A | * | 1/1996 | Tawil ........................... 725/68 |
| 5,584,046 | A | * | 12/1996 | Martinez et al. ........... 455/13.1 |
| 5,761,605 | A | | 6/1998 | Tawil et al. |
| 5,774,194 | A | | 6/1998 | Armbruster |
| 5,862,480 | A | | 1/1999 | Wild et al. |
| 5,966,187 | A | | 10/1999 | Do |
| 6,169,878 | B1 | | 1/2001 | Tawil et al. |
| 6,185,408 | B1 | * | 2/2001 | Leopold et al. ............ 455/12.1 |
| 6,208,636 | B1 | * | 3/2001 | Tawil et al. ................. 370/351 |
| 6,208,834 | B1 | * | 3/2001 | Tawil et al. ............... 455/3.02 |
| 6,356,737 | B1 | * | 3/2002 | Bjurfjell .................... 455/3.05 |
| 6,771,986 | B1 | * | 8/2004 | Oh ........................... 455/562.1 |

(Continued)

FOREIGN PATENT DOCUMENTS

EP 0552094 7/1993

(Continued)

OTHER PUBLICATIONS

COMSAT Technical Review, Reprint, "Feasibility Of Collocating A Radio Relay Station With A Sharing Earth Station", By James B Potts, vol. 2, No. 1, Spring 1972, pp. 205-219, Washington, DC.

(Continued)

*Primary Examiner*—Duc M. Nguyen
*Assistant Examiner*—Anthony S. Addy
(74) *Attorney, Agent, or Firm*—Hunton & Williams LLP

(57) ABSTRACT

A terrestrial radio system for delivering to consumers data transmission services, Internet services, two-way capabilities and single-channel or multi-channel video programming, including national, regional and local television broadcast signals, as well as an apparatus and method thereof. The terrestrial radio system transmits terrestrial signals at satellite-allocated frequencies while mitigating interference with satellite signals to reuse satellite-allocated frequencies.

31 Claims, 11 Drawing Sheets

U.S. PATENT DOCUMENTS

| | | | |
|---|---|---|---|
| 6,778,810 B1 * | 8/2004 | Anderson | 455/12.1 |
| 6,892,050 B1 * | 5/2005 | Tawil et al. | 455/12.1 |
| 6,892,068 B2 * | 5/2005 | Karabinis et al. | 455/429 |

FOREIGN PATENT DOCUMENTS

| | | |
|---|---|---|
| EP | 0 866 569 A2 * | 9/1998 |
| JP | 61159889 | 7/1986 |

OTHER PUBLICATIONS

MDS International Website, Company Profile, System and Services for Worldwide High Speed Wireless Network Solutions and MPEG2 DVB Broadcast M, 5 pages printed Mar. 12, 2001 www.mds.fr.

Addison-Wesley Wireless Communications Series "Direct Broadcast Satellite Communications", An MPEG Enabled Service by Donald C. Mead, pp. 21-22, Upper Saddle River, NJ.

* cited by examiner

SYSTEM, APPARATUS AND METHOD FOR SINGLE-CHANNEL OR MULTI-CHANNEL TERRESTRIAL COMMUNICATION

FIELD OF THE INVENTION

The present invention relates to a system, as well as an apparatus and a method, for transmitting terrestrial signals to subscribers at satellite-allocated frequencies with nominal or unnoticeable interference to satellite signals transmitted at the same frequencies. Further, the present invention relates to a system, as well as an apparatus and method, for providing a return path for terrestrial signals using a satellite uplink frequency to enable an two-way communication service. The system, apparatus and method of the invention provide data transmission services, Internet services and/or single-channel or multi-channel video programming, including national, regional and/or local television programming.

BACKGROUND OF THE INVENTION

Radio signals may be transmitted from a terrestrial (or ground-based) transmitter or from a non-terrestrial transmitter, such as a satellite. Certain frequencies onthe electromagnetic spectrum have been dedicated to satellite transmissions, by international agreement. In the case of direct broadcast satellite service ("DBS"), for example, the 1985 Regional Administrative Radio Conference (RARC) of the International Telecommunication Union established the spectrum for DBS at 17.3-17.8 GHz for the uplink and 12.2-12.7 GHz for the downlink in ITU Region 2, the Western Hemisphere. In all, thirty-two frequencies were allotted at each of eight orbital locations set aside for DBS in the United States. Significantly, the RARC also made provisions for the reuse of the satellite-allocated frequencies. See Mead, Donald C., *Direct Broadcast Satellite Communications*, pages 21-22 (2000).

Public policy favors the fullest and most efficient use of spectrum. Reuse of satellite-allocated frequencies by a terrestrial system would provide increased availability of video programming and data, as well as an alternative to cable and satellite systems. Accordingly, a terrestrial wireless system capable of transmitting multiple channels of broadband data and video to homes and places of business and/or providing a return link for data and video would be very useful. Previous approaches for increasing availability of video and broadband data have involved satellite reception of video and broadband data in combination with reception of video and broadband data from other sources. Such system are either inefficient or entirely ineffective.

For example, Armbruster, in U.S. Pat. No. 5,774,194, discloses a terrestrial and satellite television reception tuner which is used in common for both one-way terrestrial and satellite television reception. The tuner incorporates a second mixing stage which is switched as a mixer for signal conversion into a second intermediate frequency during terrestrial television reception and is switched as a component of a FM-PLL demodulator during satellite television reception. The tuner is disclosed as being particularly suitable for television receivers and video recorders which receive signals from both terrestrial antenna-signal source and from a satellite antenna-signal source.

Do, in U.S. Pat. No. 5,966,187, discloses a device for receiving a one-way digital broadcasting satellite (DBS) signal, which includes a controller for generating a first signal for selecting a program guide signal included in a DBS signal and a second signal for selecting one of a plurality of programs which are included in the program guide signal, in response to input of certain key signals, a decoder for decoding the program guide signal in response to the first signal, a storing unit for separating and storing the decoded program guide signals as position data, channel data and video data, a signal compressing unit for compressing the video data corresponding the second signal, a mixer for mixing the decoded program guide signal as a main screen signal with the compressed video data as a sub-screen signal, and a display unit for displaying the signal mixed by the mixer. The device is disclosed as receiving a DBS signal and a TV signal.

Tawil, in U.S. Pat. No. 5,483,663, discloses an apparatus for receiving one-way local programming and direct broadcast satellite transmissions, which includes receiver for receiving converted local channel signals in a first frequency band. Tawil discloses that the first frequency band is contained within a satellite broadcast frequency band in which the direct broadcast satellite signals are transmitted. Specifically, the apparatus disclosed by Tawil includes at each user or subscriber location, a first antenna for receiving the converted local channel signals from a terrestrial transmitter and a second antenna for receiving direct broadcast satellite channel signals from a satellite. The disclosed apparatus further includes a combiner for combining the converted local channel signals in the direct broadcast satellite channel signals on a single propagation path. A signal processor/decoder processes the combined signals on the single propagation path to produce a desired channel output to drive a television set. It is disclosed that to the processor/decoder the combined channel signal appears as if it had been all broadcast directly from the satellite and therefore, the apparatus requires no additional receiver for receiving local programming along with regional and national programming received via satellite.

Tawil et al., in U.S. Pat. Nos. 5,761,605 and 6,169,878, disclose an apparatus and method for simultaneously receiving one-way satellite and terrestrial signals. The disclosed apparatus includes a first antenna at a user location which receives signals at a first frequency where the signals are traveling only within a first directional reception range as measured from a centerline of the first antenna. The first antenna has its centerline aligned to receive direct broadcast satellite signals transmitted from a satellite in geostationary satellite orbit about the earth. A second antenna is disclosed as being at the user location to receive signals at the first frequency where the signals are traveling only within a second directional reception range as measured from a centerline of the second antenna. Further, the second antenna is aligned to receive signals transmitted at the first frequency from a terrestrial transmitting location remote from the user location. According to the reference, a satellite's position is such with respect to the user location that the satellite transmits directionally in directions outside of the directional reception range of the second antenna.

Wild et al., in U.S. Pat. No. 5,862,480, disclose a method and apparatus for managing service accessibility between differing radio telecommunications networks. The disclosed method allows a network and a multi-network system to obtain access information for a subscriber unit. The method involves requesting access information from an access server which determines whether a group to which the subscriber unit belongs can access the network or other networks from the subscriber unit location. The reference discloses the applicability of the network and apparatus in enabling hand-offs between overlapping networks. In particular, FIG. 2 illustrates a satellite cellular foot print with an overlapping terrestrial cellular foot print. The disclosed cellular satellite foot print is STET by satellite and includes satellite cells while the terrestrial cellular foot print is projected by terrestrial antenna and includes terrestrial cells.

Martinez et al., in U.S. Pat. No. 5,584,046, disclose a method and apparatus for spectrum sharing between one-way satellite and terrestrial broadcasting services using temporal spatial synchronization. The disclosed system and method uses time division multiple access between two types of service providers to achieve synchronization. The reference discloses that satellite and terrestrial broadcasting services are assigned geographic cell boundaries to prevent conflicting simultaneous use of allocated spectrum. The spatial synchronization of cell boundaries can occur before hand by agreement between the users of the satellite and terrestrial services. This spatial synchronization may conform to geographic as well as political boundaries. In the disclosed system, satellite and terrestrial services are assigned time slots to use a given spectrum within a given area. Methods are also disclosed for synchronizing the time slots to prevent interference between the services.

Sakashita et al., in U.S. Pat. No. 4,939,789, discloses a signal receiver for terrestrial and satellite broadcasting. The disclosed signal receiver is capable of receiving and demodulating a satellite broadcasting signal which is an FM signal and a terrestrial broadcasting signal which is an AM signal. FM and AM signals are frequency-converted into signals having frequencies in a same intermediate frequency band by making common use of a radio frequency amplifier, a mixer, a local oscillator and an intermediate frequency filter. At the time of reception of an FM signal, the FM signal is demodulated in a phase-locked loop circuit, and a local oscillator is subjected to frequency modulation by a part of the demodulated signal, thereby constituting an FM negative feedback loop, and thus narrowing the occupied bandwidth of the FM signal. It is disclosed that at the time of reception of an FM signal, the phase-locked loop circuit is used to regenerate a carrier, and the output signal of the phase-locked loop circuit is input to a multiplier to affect synchronous detection of the input signal It is further disclosed that at this time, the FM negative feedback to the local oscillator is utilized to affect automatic frequency control, thereby achieving stabilization of this synchronous detection.

The sharing of frequency bands between satellite and terrestrial stations has also been addressed. For example, the feasibility of frequency sharing between an earth station and a collocated radio relay station used for interconnection to the earth station has been addressed. See Potts, James B., "Feasibility of collocating a radio relay station with a sharing earth station", *COMSAT Technical Review*, Vol. 2, No. 1, pages 205-219 (Spring 1972). According to Potts, the interference condition that results from collocation are tolerable, and since they are controlled by free space propagation, one can calculate the actual interference levels rather simply with a high degree of confidence. Potts discloses that it may also be feasible for the earth station to transmit in the shared frequency band. However, even if a viable system for combining satellite service with local programming is achieved, such a system generally requires additional complex and expensive equipment which undermines the economic feasibility of the system. Further, satellite systems such as DBS, occupy a portion of the electromagnetic spectrum which would otherwise be available for terrestrial signal transmissions. Given the limited available frequencies for terrestrial signal transmissions on the electromagnetic spectrum, as well as the advantages of avoiding the need for complex and costly receiving equipment, it would be desirable to provide a terrestrial radio system which would provide all of the national or regional television programming, such as that available typically only through satellite services, along with local television programming. Further, it would be desirable to have a terrestrial radio system which provides consumers with data transmission services, Internet services and two-way capabilities. Moreover, it would be desirable to provide a terrestrial radio system which reuses satellite-allocated frequencies without causing interference to satellite signals simultaneously transmitted at the same frequencies.

SUMMARY OF THE INVENTION

The present invention provides a terrestrial radio system, as well as an apparatus and method, for delivering to consumers data transmission services (e.g., broadband data), Internet services and single-channel or multi-channel video programming, including national, regional and local television broadcast signals. The present invention provides terrestrial signals at satellite-allocated frequencies while mitigating interference with signals transmitted from satellites, including signals transmitted simultaneously at the same frequencies from satellites. Further, the present invention provides two-way capabilities, such as interactive television.

One embodiment of the present invention is a single-channel or multi-channel system for transmitting terrestrial signals to a subscriber from a provider site, which comprises: adirectional terrestrial antenna at the provider site for transmitting terrestrial signals at a satellite-allocated frequency selected to mitigate interference with non-terrestrial signals; a subscriber antenna at a subscriber location for receiving the terrestrial signals transmitted from the directional terrestrial antenna, and processing means at the subscriber location for processing the terrestrial signals into an output.

Another embodiment of the present invention is a single-channel or multi-channel system for transmitting terrestrial signals to a subscriber from a provider site, which comprises: a directional terrestrial antenna at the provider site for transmitting terrestrial signals to the subscriber at a satellite-allocated frequency; a subscriber antenna at a subscriber location for receiving the terrestrial signals transmitted from the directional terrestrial antenna, said subscriber antenna and said directional terrestrial antenna being aligned to mitigate interference with satellite signals; and processing means at the subscriber location for processing the terrestrial signals into an output.

A further embodiment of the present invention is a single-channel or multi-channel system for transmitting terrestrial signals to a subscriber from a provider site, which comprises: a directional terrestrial antenna at the provider site for transmitting terrestrial signals at a first satellite-allocated frequency; a first subscriber antenna at a subscriber location for receiving the terrestrial signals transmitted from the directional terrestrial antenna at the first satellite-allocated frequency; a second subscriber antenna at the subscriber location for receiving satellite signals at a second satellite-allocated frequency; said second satellite allocated frequency being different from said first satellite-allocated frequency; and processing means at the subscriber location for processing the terrestrial signals and the satellite signals into an output.

A further embodiment of the present invention is a single-channel or multi-channel system for transmitting terrestrial signals to a subscriber from a provider site, which comprises: a directional terrestrial antenna at the provider site for transmitting terrestrial signals at a first satellite-allocated frequency; a first subscriber antenna at a subscriber location for receiving the terrestrial signals transmitted from the directional terrestrial antenna at the first satellite-allocated frequency; a second subscriber antenna at the subscriber location for receiving satellite signals at a second satellite-allocated frequency; said second satellite-allocated frequency being different from said first satellite-allocated frequency; processing means at the subscriber location for separately directing the terrestrial signals and the satellite signals to a receiver; and selection means at the receiver for selecting a channel from the terrestrial signals and the satellite signals to provide an output.

A still further embodiment of the present invention is a single-channel or multi-channel system for transmitting terrestrial signals to a subscriber from a provider site, which comprises: a directional terrestrial antenna with a main axis of radiation directed generally southward at the provider site for transmitting terrestrial signals at a first satellite-allocated frequency and a second satellite allocated frequency, said second satellite-allocated frequency being different from said first satellite-allocated frequency; a subscriber antenna at the subscriber location for receiving the terrestrial signals transmitted from the directional terrestrial antenna at the first satellite-allocated frequency and the second satellite-allocated frequency; and processing means for processing said terrestrial signals into an output.

An even further embodiment of the present invention is a single-channel or multi-channel system for transmitting terrestrial signals to a subscriber from a provider site, which comprises: a directional terrestrial antenna with a main axis of radiation directed generally southward at the provider site for transmitting terrestrial signals at a satellite-allocated frequency; a first subscriber antenna at the subscriber location aligned in the northward direction for receiving the terrestrial signals transmitted from the directional terrestrial antenna at the satellite-allocated frequency; a second subscriber antenna at the subscriber locationaligned in the generally southward direction for receiving satellite signals transmitted at the satellite-allocated frequency; disabling means which disables a first feed from the first subscriber antenna or a second feed from the second subscriber antenna in response to selection by the subscriber of a channel from a plurality of channels, said disabling means thereby preventing simultaneous transmission of terrestrial signals and satellite signals to the subscriber; and processing means at the subscriber location for processing the terrestrial signals or the satellite signals into an output.

Another embodiment of the present invention is a single-channel or multi-channel system for receiving terrestrial signals at a provider site from a subscriber, which comprises: a subscriber antenna at a subscriber location for transmitting the terrestrial signals to the provider site at a satellite-allocated frequency selected to mitigate interference with non-terrestrial signals; a directional terrestrial antenna at the provider site for receiving the terrestrial signals at the satellite-allocated frequency selected to mitigate interference with non-terrestrial signals; and processing means at the provider site for processing the terrestrial signals into an output.

Still another embodiment of the present invention is a single-channel or multi-channel system for receiving terrestrial signals at a provider site from a subscriber, which comprises: a subscriber antenna at a subscriber location for transmitting the terrestrial signals at a satellite-allocated frequency to the provider site; a directional terrestrial antenna at the provider site for receiving the terrestrial signals from the subscriber at the satellite-allocated frequency; said subscriber antenna and said directional terrestrial antenna being aligned to mitigate interference with satellite signals; and processing means at the provider site for processing the terrestrial signals into an output.

A still further embodiment of the present invention is a single-channel or multi-channel system for receiving terrestrial signals at a provider site from a subscriber, which comprises: a subscriber antenna at a subscriber location with a main axis of radiation directed northward for transmitting terrestrial signals to the provider site at a first satellite-allocated frequency and a second satellite-allocated frequency, said second satellite-allocated frequency being different from said first satellite-allocated frequency; a directional terrestrial antenna at the provider site for receiving terrestrial signals at the first satellite-allocated frequency and the second satellite allocated frequency; and processing means at the provider site for processing said terrestrial signals into an output.

An even further embodiment of the present invention is a single-channel or multi-channel system for transmitting terrestrial signals from a primary provider site to a secondary provider site, which comprises: a primary directional terrestrial antenna at the primary provider site for transmitting terrestrial signals at a satellite-allocated frequency to the secondary provider site; and a secondary directional terrestrial antenna at the secondary provider site for receiving the terrestrial signals at the satellite-allocated frequency from the primary directional terrestrial antenna, said primary directional terrestrial antenna and said secondary directional terrestrial antenna being aligned to mitigate interference with satellite signals.

Yet another embodiment of the present invention is a single-channel or multi-channel system for transmitting terrestrial signals to a subscriber, which comprises: means for transmitting the terrestrial signals to the subscriber at a satellite-allocated frequency from a provider site without interfering with satellite signals; and means for receiving the terrestrial signals at the satellite-allocated frequency at a subscriber location; and means for processing the terrestrial signals into an output at the subscriber location.

Another embodiment of the present invention is a method for transmitting terrestrial signals to a subscriber or a plurality of subscribers from a provider site to provide single-channel or multi-channel video programming or data, comprising: transmitting terrestrial signals from a directional terrestrial antenna at the provider site at a satellite-allocated frequency selected to mitigate interference with non-terrestrial signals; receiving at a subscriber antenna at a subscriber location the terrestrial signals transmitted from the directional terrestrial antenna; and processing at the subscriber location the terrestrial signals into an output.

Still another embodiment of the present invention is a method for transmitting terrestrial signals to a subscriber from a provider site, comprising: transmitting terrestrial signals at a satellite-allocated frequency from a directional terrestrial antenna at the provider site; receiving at a subscriber antenna at a subscriber location the terrestrial signals transmitted from the directional terrestrial antenna, said subscriber antenna and said directional terrestrial antenna being aligned to mitigate interference with satellite signals; and processing at the subscriber location the terrestrial signals into an output.

A further embodiment of the present invention is a method for transmitting terrestrial signals to a subscriber from a provider site, comprising: transmitting terrestrial signals from a directional terrestrial antenna at the provider site at a first satellite-allocated frequency; receiving at a first subscriber antenna at a subscriber location the terrestrial signals transmitted from the directional terrestrial antenna at the first satellite-allocated frequency; receiving at a second subscriber antenna at the subscriber location satellite signals at a second satellite-allocated frequency; said second satellite allocated frequency being different from said first satellite-allocated frequency; and processing at the subscriber location the terrestrial signals and the satellite signals into an output.

Yet another embodiment of the present invention is a method for transmitting terrestrial signals to a subscriber from a provider site, comprising: transmitting terrestrial signals from a directional terrestrial antenna at the provider site at a first satellite-allocated frequency; receiving at a first subscriber antenna at a subscriber location the terrestrial signals transmitted from the directional terrestrial antenna at the first satellite-allocated frequency; receiving at a second subscriber antenna at the subscriber location satellite signals at a second satellite-allocated frequency; said second satellite-allocated frequency being different from said first satellite-allocated frequency; separately directing the terrestrial signals and the satellite signals to to the receiver; and selecting a channel from the terrestrial signals and the satellite signals to provide an output at the subscriber location.

A further embodiment of the present invention is a method for transmitting terrestrial signals to a subscriber from a provider site, comprising: transmitting terrestrial signals at a first satellite-allocated frequency and a second satellite allocated frequency from a directional terrestrial antenna with a main axis of radiation directed generally southward, said second satellite-allocated frequency being different from said first satellite-allocated frequency; receiving at a subscriber antenna at a subscriber location the terrestrial signals at the first satellite-allocated frequency and the second satellite-allocate frequency transmitted from the directional terrestrial antenna; and processing at the subscriber location said terrestrial signals into an output.

An even further embodiment of the present invention is a method for transmitting terrestrial signals to a subscriber from a provider site, comprising: transmitting terrestrial signals at a satellite-allocated frequency from a directional terrestrial antenna with a main axis of radiation directed generally southward at the provider site to a subscriber location; receiving at a first subscriber antenna at the subscriber location aligned in the northward direction the terrestrial signals transmitted from the directional terrestrial antenna at the satellite-allocated frequency; receiving at a second subscriber antenna at the subscriber location aligned in the generally southward direction satellite signals transmitted at the satellite-allocated frequency; disabling a first feed from the first subscriber antenna or a second feed from the second subscriber antenna in response to selection by the subscriber of a channel from a plurality of channels, thereby preventing simultaneous transmission of terrestrial signals and satellite signals to the subscriber; and processing at the subscriber location the terrestrial signals or the satellite signals into an output.

Another embodiment of the present invention is a method for receiving terrestrial signals at a provider site from a subscriber, comprising: transmitting from a subscriber antenna at a subscriber location the terrestrial signals to the provider site at a satellite-allocated frequency selected to mitigate interference with non-terrestrial signals; receiving at a directional terrestrial antenna at the provider site the terrestrial signals at the satellite-allocated frequency selected to mitigate interference with non-terrestrial signals; and processing at the provider site the terrestrial signals into an output.

Still another embodiment of the present invention is a method for receiving terrestrial signals at a provider site from a subscriber, comprising: transmitting from a subscriber antenna at a subscriber location to the provider site terrestrial signals at a satellite-allocated frequency; receiving at a directional terrestrial antenna at the provider site the terrestrial signals from the subscriber at the satellite-allocated frequency; said subscriber antenna and said directional terrestrial antenna being aligned to mitigate interference with satellite signals; and processing means for processing the terrestrial signals into an output.

A still further embodiment of the present invention is a method for receiving terrestrial signals at a provider site from a subscriber, comprising: transmitting from a subscriber antenna with a main axis of radiation directed northward at a subscriber location to a provider site terrestrial signals at a first satellite-allocated frequency and a second satellite-allocated frequency, said second satellite-allocated frequency being different from said first satellite-allocated frequency; receiving at a directional terrestrial antenna at the provider site terrestrial signals at the first satellite-allocated frequency and the second satellite allocated frequency; and processing means at the provider site for processing said terrestrial signals into an output.

An even further embodiment of the present invention is a method for transmitting terrestrial signals from a primary provider site to a secondary provider site, which comprises: transmitting from a primary directional terrestrial antenna at the primary provider site to the secondary provider site the terrestrial signals at a satellite-allocated frequency; and receiving from the primary directional terrestrial antenna at a secondary directional terrestrial antenna at the secondary provider site the terrestrial signals at the satellite-allocated frequency, said primary directional terrestrial antenna and said secondary directional terrestrial antenna being aligned to mitigate interference with satellite signals These and other objects, advantages, and features of the invention will be apparent from the following detailed description of the invention, considered along with the accompanying drawings.

DETAILED DESCRIPTION OF THE PREFERRED EMBODIMENT

Figure 1:
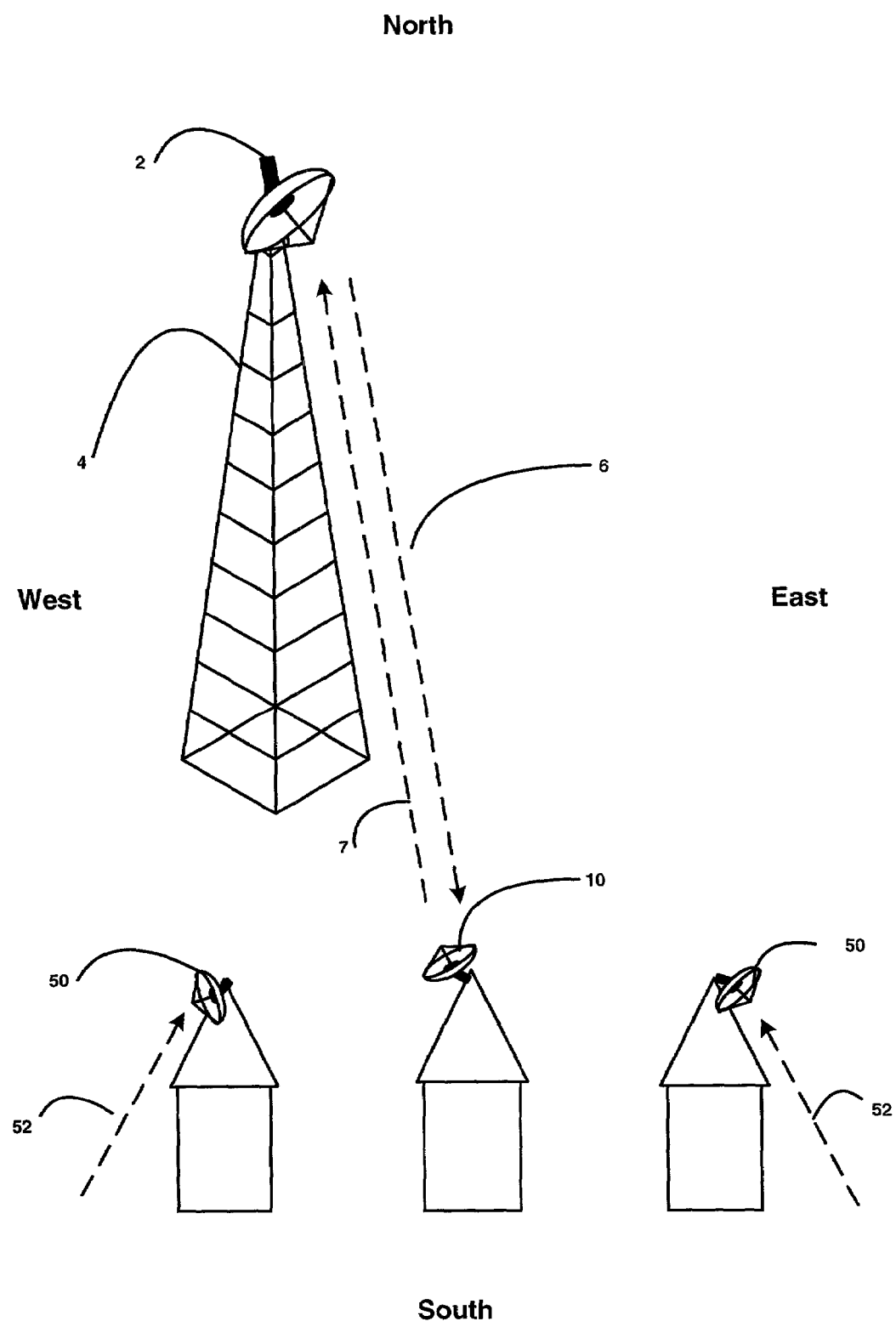
FIG. 1 is a schematic representation showing the positioning of a directional terrestrial antenna and a subscriber antenna according to one embodiment of the invention.

Table I illustrates eight systems, each of which corresponds to eight general categories of terrestrial radio systems, in accordance with various embodiments of the inventive subject matter, without intending to be limited thereto. A person of ordinary skill in the art would readily understand, based upon the disclosure herein, that there are numerous ways to implement and/or combine these general categories of the present invention.

TABLE I

| SYSTEM | SIGNAL ORIGIN | SIGNAL/ FREQUENCY | SUBSCRIBER ANTENNA AT SUBSCRIBER SITE | COMBINING MEANS | DISABLING MEANS |
| --- | --- | --- | --- | --- | --- |
| 1 | Terrestrial (from provider site) | $1^{st}$ satellite-allocated downlink | 1 | No | No |
| 2 | Terrestrial (from provider site) | $1^{st}$ satellite-allocated downlink | 1 | Optional | No |
|   | Terrestrial (provider site) | $2^{nd}$ satellite-allocated downlink |   |   |   |
| 3 | Terrestrial (from provider site) | $1^{st}$ satellite-allocated downlink | 2 | Optional | No |
|   | Satellite | $2^{nd}$ satellite-allocated downlink |   |   |   |
| 4 | Terrestrial (from provider site) | $1^{st}$ satellite-allocated downlink | 2 | No | Yes |
|   | Satellite | $2^{nd}$ satellite-allocated downlink |   |   |   |
| 5 | Terrestrial (from subscriber location) | $1^{st}$ satellite-allocated uplink | 1 | No | No |
| 6 | Terrestrial (from subscriber location) | $1^{st}$ satellite-allocated uplink | 1 | Optional | No |
|   | Terrestrial (from subscriber location) | $2^{nd}$ satellite-allocated uplink |   |   |   |
| 7 | Terrestrial (from subscriber location) | satellite-allocated uplink | 2 | Optional | No |
|   | Satellite | satellite-allocated downlink |   |   |   |
| 8 | Terrestrial (from provider) | satellite-allocated downlink | 1 | No | No |
|   | Terrestrial (from subscriber) | satellite-allocated uplink |   |   |   |

Referring to Table I, System 1 includes a directional antenna, located at a site from which a provider of single-channel service distributes programming and data to subscribers ("provider site"), which transmits terrestrial signals at one satellite-allocated downlink frequency to a subscriber having one subscriber antenna, or a plurality of subscribers each having one subscriber antenna. The receiving apparatus at the subscriber location for System 1 does not require any means for combining singles or any means for disabling a feed.

Referring still to Table I, System 2 describes a further embodiment of the invention wherein a directional terrestrial antenna at a provider site transmits signals at two or more different satellite-allocated downlink frequencies to one subscriber antenna at a subscriber location (or to one subscriber antenna at each of a plurality of subscriber location).

System 2 optionally incorporates combining means for combining the signal at the first satellite-allocated downlink frequency with the signals transmitted at the second satellite-allocated downlink frequency to form signals on a single signal path and thus to obviate the need for more than one feed. Further, the combining of the signals transmitted at two different frequencies also obviates the need for disabling means. The processing means and/or combining means optionally includes a first LNB and a second LNB, each LNB having a slightly different local oscillator frequency. In this manner, the signals are translated to a close or adjacent intermediate frequency (IF) bands for subsequent processing. A person of ordinary skill in the art world readily understand, based upon the disclosure herein, how to incorporate into the applicable implementations of the present invention first and second LNBs having slightly different local oscillator frequencies, including readily understanding which local oscillator frequencies to use, without undue experimentation.

Referring to Table I, a third embodiment of the invention is described as system 3, wherein a directional terrestrial antenna at a provider site transmits terrestrial signals at a first satellite-allocated downlink frequency to a first subscriber antenna at a subscriber location, and a second subscriber antenna at the subscriber location receives signals transmitted from a satellite at a second satellite-allocated frequency. In accordance with this system, the signals at the different frequencies are combined by combining means, thereby obviating the need for separate feeds or the need for selection or disabling means.

Referring again to Table I, a fourth embodiment of the invention is described as System 4, wherein a directional terrestrial antenna at a provider site transmits terrestrial signals at a first satellite-allocated downlink frequency to a first subscriber antenna at a subscriber location, while a second subscriber antenna at the subscriber location receives signals transmitted from a satellite also at the first satellite-allocated downlink frequency. System 4 utilizes disabling means, such as a voltage disabler as described below, without limitation, to disable one of the two feeds leading from each of the two subscriber antennas to prevent the simultaneous processing of the signals originating from the terrestrial source and the signals originating from the satellite source. It would be appreciated by persons of ordinary skill in the art that additional antennas, signal source and frequencies could be added to each system in accordance with the present invention, in addition to other modifications within the skill of the art.

Again referring to Table I, a fifth embodiment of the present invention is described as System 5, wherein an antenna at a subscriber location transmits terrestrial signals at a first satellite-allocated uplink frequency to an antenna at a provider site.

Still referring to Table I, a sixth embodiment of the present invention is described as System 6, wherein an antenna at a subscriber site transmits terrestrial signals at a first and second satellite-allocated uplink frequency to an antenna at a provider site. This provides at least one full GHz of service. Combining means, as described above in regard to System 2, are optionally utilized at the provider sire to obviate the need for more than one feed from the antenna.

A seventh embodiment of the present invention is described in Table I as System 7, wherein an antenna at a subscriber location transmits terrestrial signals at a satellite-allocated uplink frequency to a provider site, while the antenna at the subscriber location (or a second antenna at the subscriber location, for example) receives signals from a satellite at a satellite-allocated downlink frequency.

Also in Table I, an eighth embodiment of the present invention is described as System 8, wherein an antenna at a provider site transmits terrestrial signals at a satellite-allocated downlink frequency to a subscriber at a subscriber location, and an antenna at the subscriber location transmits terrestrial signals to the antenna at the provider site (e.g., a return link providing two-way communication) at a satellite-allocated uplink frequency.

The present invention contemplates that each system may incorporate a plurality of directional terrestrial antennas and/or a plurality of subscribers in any number and combination to obtain a desired result. Moreover, any combination of systems is possible. For example, Systems 5 and/or 6 may be combined with any other provider communication system in any manner to provide two-way communication between a service provider and a subscriber or plurality of subscribers, without limitation. Systems 5 and/or 6 are preferably combined with one or more of Systems 1, 2, 3 and/or 4, or the various implementations thereof, as described herein. It would be readily understood by persons of ordinary skill in the art, based upon the disclosure herein, how to manipulate the number of directional terrestrial antennas in accordance with the number of subscribers, and the location of the subscribers, in order to achieve the desired effect.

Table II describes each of the eight general systems, which are identified in Table I, in accordance with various preferred embodiments of the present invention, including examples of specific ranges of signal frequencies, without limitation. It would be well within the skill in the art to select a desirable or appropriate frequency under any given set of circumstances, based upon the guidance provided herein.

TABLE II

| System | Signal Origin | Signal Frequency | Subscriber antenna | Combining Means | Selection Means or Disabling Means |
|---|---|---|---|---|---|
| 1a | Terrestrial (from provider site) | 11.7 GHz to 12.2 GHz or 41.0 GHz to 42.5 GHz | 1 | No | No |
| 1b | Terrestrial (from provider site) | 11.7 GHz to 12.7 GHz or 41.0 GHz to 42.5 GHz | 1 | No | No |
| 2 | Terrestrial (from provider site) | 11.7 GHz to 12.2 GHz | 1 | Optional | No |

TABLE II-continued

| System | Signal Origin | Signal Frequency | Subscriber antenna | Combining Means | Selection Means or Disabling Means |
|---|---|---|---|---|---|
| | Terrestrial (from provider site) | 41.0 GHz to 42.5 GHz | | | |
| 3 | Terrestrial (from provider site) | 11.7 GHz to 12.2 GHz or 41.0 GHz to 42.5 GHz | 2 | Optional | No |
| | Satellite | 12.2 GHz to 12.7 GHz or 41.0 to 42.5 GHz | | | |
| 4 | Terrestrial | 11.7 GHz to 12.7 GHz or 41.0 GHz to 42.5 GHz | 2 | No | Yes |
| | Satellite | 11.7 GHz to 12.7 GHz or 41.0 GHz to 42.5 GHz | | | |
| 5 | Terrestrial (from subscriber location) | 14.0 GHz to 14.5 GHz or 17.3 GHz to 17.8 GHz | 1 | No | No |
| 6 | Terrestrial (from subscriber location) | 14.0 GHz to 14.5 GHz | 1 | Optional | No |
| | Terrestrial (from subscriber location) | 17.3 GHz to 17.8 GHz | | | |
| 7 | Terrestrial (from subscriber location) | 11.7 GHz to 12.2 GHz or 41.0 GHz to 42.5 GHz | 2 | Optional | No |
| | Satellite | 11.7 GHz to 12.7 GHz or 41.0 GHz to 42.5 GHz | | | |
| 8 | Terrestrial (from provider site) | 11.7 GHz to 12.2 GHz or 41.0 GHz to 42.5 GHz | 1 | No | No |
| | Terrestrial (from subscriber location) | 14.0 GHz to 14.5 GHz or 17.3 GHz to 17.8 GHz | | | |

Figure 2:
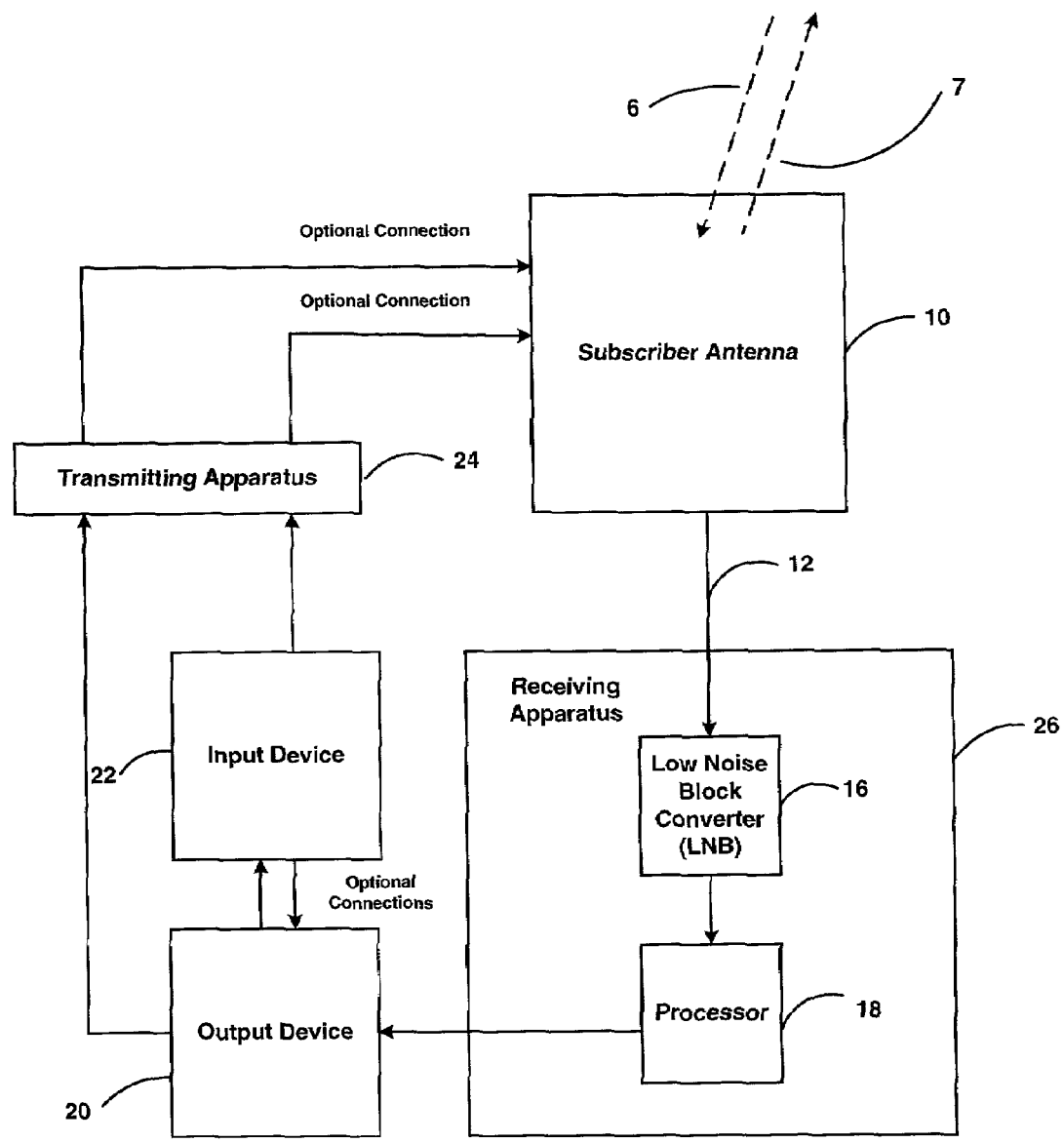
FIG. 2 is a schematic representation of the apparatus that is associated with a subscriber location according to the embodiment of the invention described in FIG. 1.

System 1 is illustrated in further detail in FIGS. 1 and 2. As shown in FIG. 1, the system involves a directional terrestrial antenna 2 supported by a support structure 4, and positioned so that terrestrial signals 6 are transmitted in the generally southward direction. The terrestrial signals 6 are received by a subscriber antenna 10 which is located at a subscriber location. As shown in FIG. 1, non-subscriber receiving antennas 50 are positioned to receive satellite signals 52 transmitted from the south and therefore do not receive the terrestrial signals 6. Thus, the terrestrial signals 6 do not interfere with the satellite signals 52, even when the terrestrial signals 6 and the satellite signals 52 are transmitted, and received, at the same frequency simultaneously. In this manner, the satellite-allocated frequencies are reused by the terrestrial antenna.

FIGS. 1 and 2 also illustrate System 5 as an optional component included with System 1. As shown in FIG. 1, and also in FIGS. 3, 5 and 7 further discussed below, return-link terrestrial signals 7 at a satellite-uplink frequency are transmitted from the subscriber antenna 10 at the subscriber location to the directional terrestrial antenna 2 at the provider site. This illustrates the two-way communication possible between the subscriber and the provider.

FIG. 2 illustrates the receiving apparatus at a subscriber location in accordance with the invention described in FIG. 1. As shown in FIG. 2, the subscriber antenna 10 receives the terrestrial signals 6 transmitted at a certain satellite-allocated frequency from a terrestrial antenna 2. The terrestrial signals 6 are directed by feed 12 to a low-noise amplifier and block converter (LNB) 16 where the signals are amplified and then directed to a processor 18 for demodulation and other processing prior to being directed to an output device 20. The output device 20 is a television, radio, computer, or other such device, without limitation.

As also shown in FIG. 2, as well as in FIGS. 4, 6 and 8 discussed in further detail below, a transmitting apparatus 24 is optionally connected to the subscriber antenna 10 and the output device 20 both directly and indirectly through an input device 22. The optional connection provides two-way communication between the provider and the subscriber.

Figure 3:
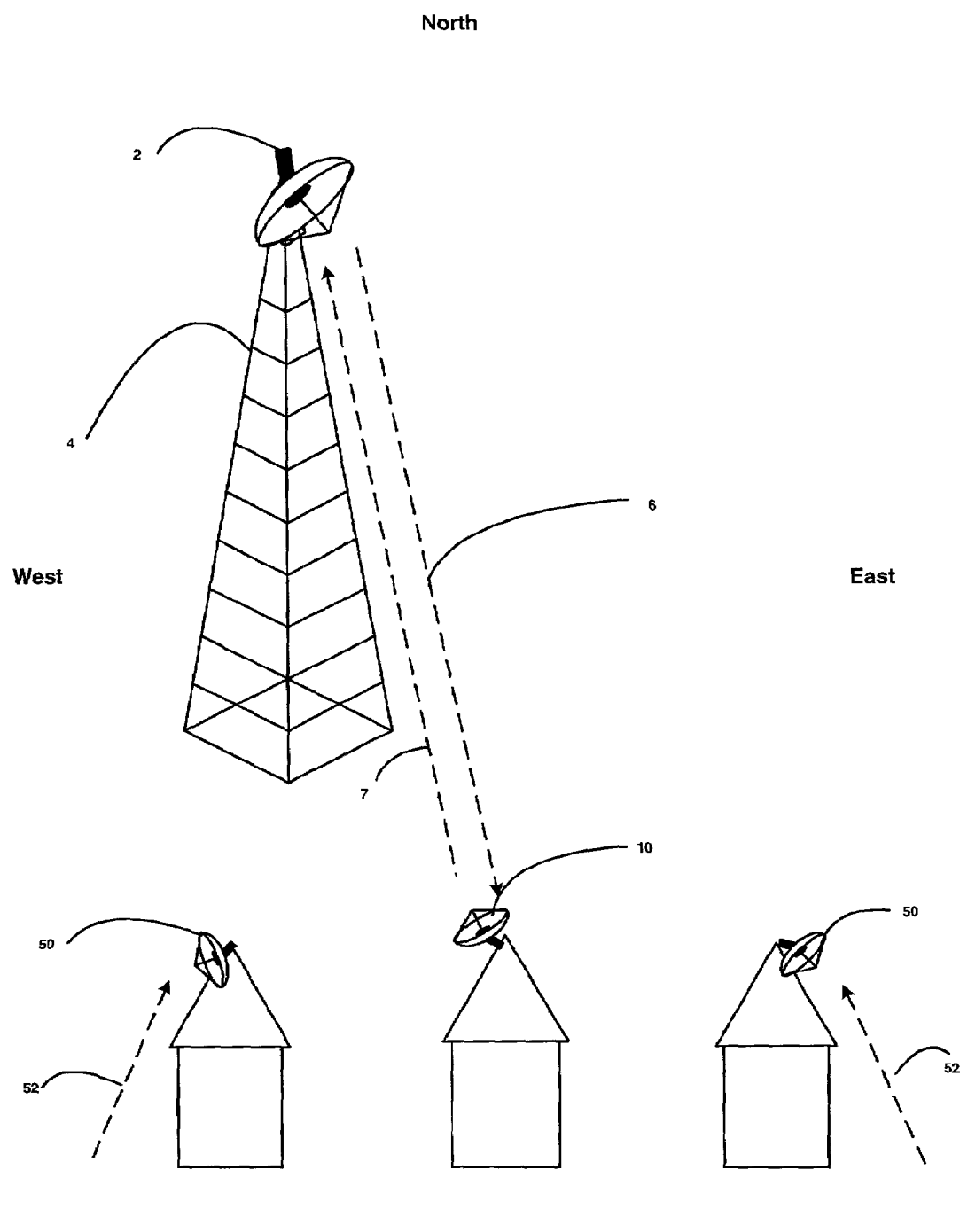
FIG. 3 is a schematic representation showing the positioning of the directional terrestrial antenna and the subscriber antenna at a subscriber location in accordance with one embodiment of the invention.
Figure 4:
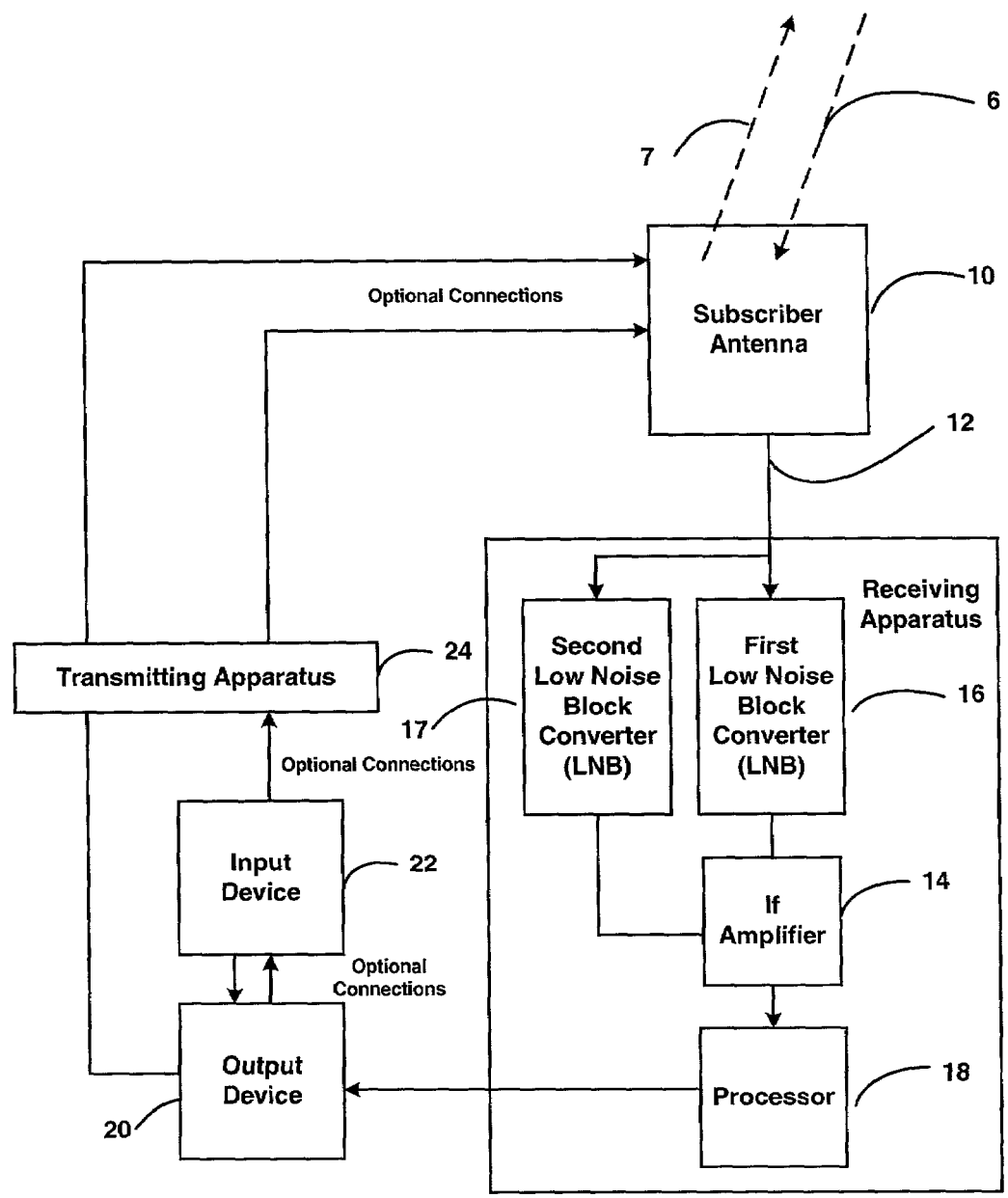
FIG. 4 is a schematic representation of components of the apparatus that is associated with the subscriber antenna at a subscriber location in accordance with the embodiment of the invention described in FIG. 3.

System 2 of Table I is described in FIGS. 3 and 4. Referring to FIG. 3, the system involves a directional terrestrial antenna 2, supported by a support structure 4 and positioned so that terrestrial signals 6 are transmitted in the generally southward direction. The terrestrial signals 6 are received by a subscriber antenna 10 which is located at a subscriber location. As shown in FIG. 1, non-subscriber receiving antennas 50 positioned to receive satellite signals 52 transmitted from the south, and therefore do not receive the terrestrial signals 6. Thus, the terrestrial signals 6 do not interfere with the satellite signals 52, even when the terrestrial signals 6 and the satellite signals 52 are simultaneously transmitted and/or received at the same frequency. In this manner, the satellite-allocated frequencies are reused by the terrestrial antenna.

Referring to FIG. 4, a subscriber antenna 10 receives terrestrial signals 6 from the terrestrial antenna 2 at a first satellite-allocated frequency and at a second satellite-allocated frequency. The terrestrial signals at the first and second satellite-allocated frequencies are directed by a feed 12 to a first low-noise amplifier and block converter (LNB) 16 at a first local oscillator frequency and a second LNB 17 at a second local oscillator frequency where the terrestrial signals are amplified and then directed to a processor 18. The first local oscillator frequency is slightly different from the second local oscillatory frequency such that the incoming signals are translated to nearby or adjacent intermediate frequency (IF) bands. The processor 18 demodulates the amplified signals and provides the demodulated signals to an output device 20. In this manner, signals from multiple terrestrial sources, or from one terrestrial source, at different satellite-allocated frequencies are simultaneously received and processed. It is thus possible to provide at least 1 GHz of service to subscribers.

Figure 5:
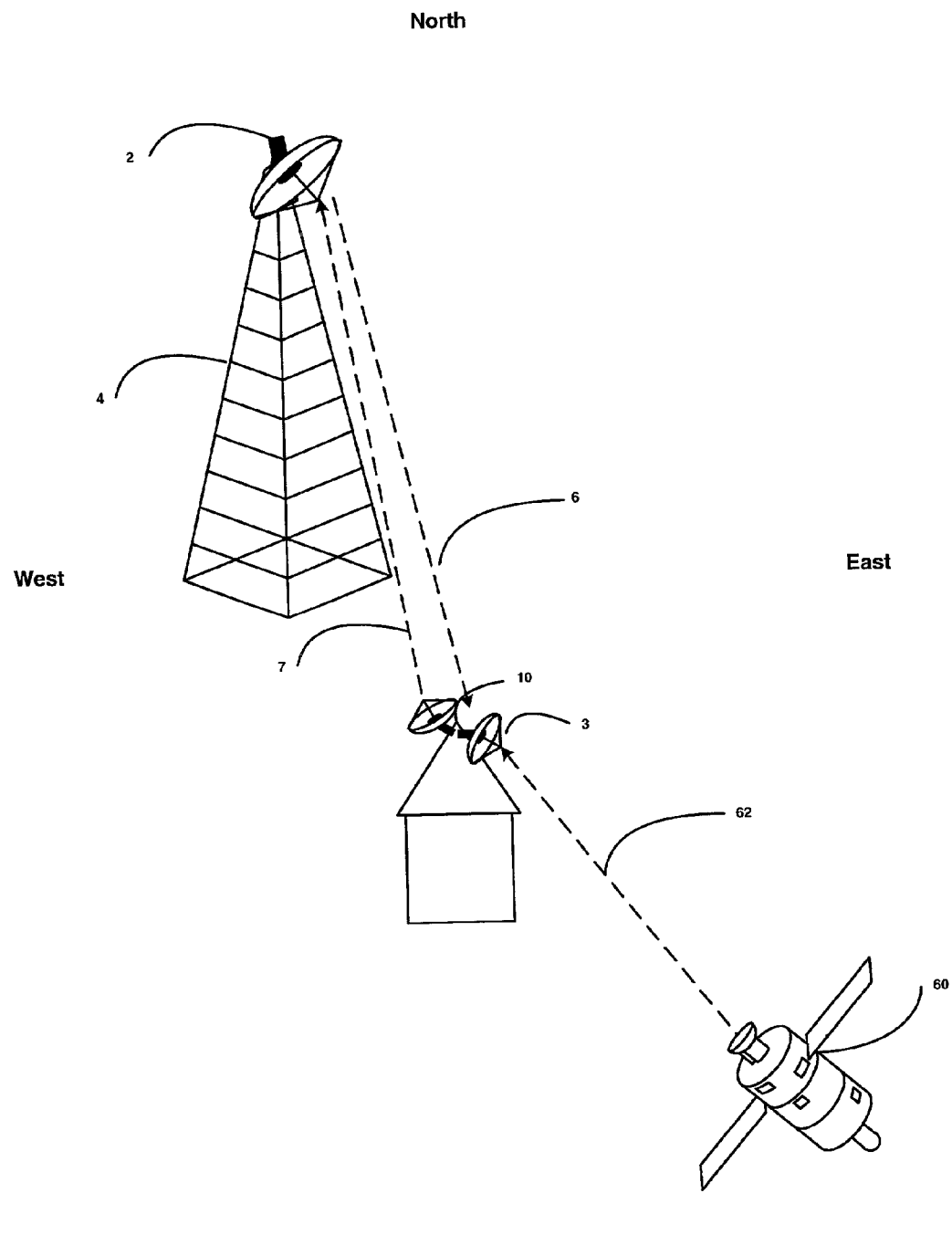
FIG. 5 is a schematic representation showing the positioning of a directional terrestrial antenna and a satellite transmitter in relation to a subscriber antenna at a subscriber location in accordance with one embodiment of the invention.
Figure 6:
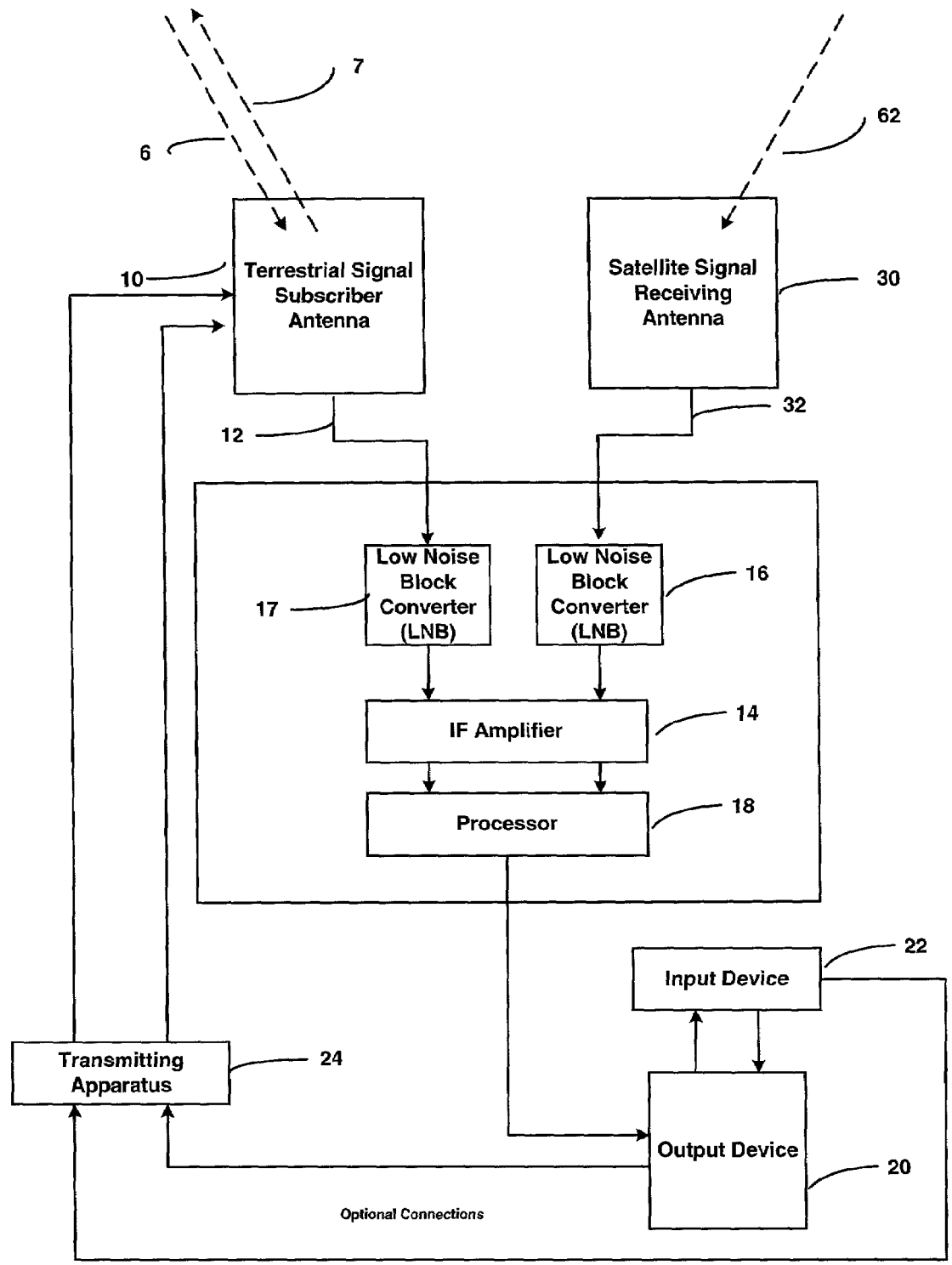
FIG. 6 is a schematic representation showing components of the apparatus associated with a subscriber antenna at a subscriber location in accordance with the embodiment of the invention described in FIG. 5.

FIGS. 5 and 6 illustrate a further implementation of the invention as described in System 3 of Table II. Referring to FIG. 5, a directional terrestrial antenna 2 situated on a supporting structure 4 transmits a terrestrial signal 6 to a subscriber antenna 10 at a subscriber location. The terrestrial antenna 2 is positioned so that the terrestrial signal 6 is transmitted in the generally southward direction. The subscriber antenna 10 is aligned in the northward direction to receive the terrestrial signals 6. The terrestrial signal 6 is transmitted at a first satellite-allocated frequency.

Referring still to FIG. 5, a satellite-based transmitter 60 transmits a satellite signal 62 to a second subscriber antenna 30 at the subscriber location. The satellite-based transmitter 60 transmits the satellite signals 62 in the northward direction. The second subscriber antenna 30 is aligned in the generally southward direction to receive the satellite signals 62. The satellite signals 62 are transmitted at a second satellite-allocated frequency.

Referring to FIG. 6, a first subscriber antenna 10 receives terrestrial signals 6 from a terrestrial antenna 2. A second subscriber antenna 30 receives satellite signals 62 from a satellite-based transmitter 60. The terrestrial signals 6 are transmitted at first satellite-allocated frequency and the satellite signals 62 are transmitted at a second satellite-allocated frequency. A first feed 12 directs the terrestrial signals at the first satellite-allocated frequency to a first low-noise amplifier and block converter, LNB 16. A second feed 32 directs the satellite signals 62 at the second satellite-allocated frequency to a second LNB 17 having a slightly different local oscillator frequency so that the translated terrestrial and satellite signals are in nearby or adjacent intermediate frequency (IF) bands The combining of signals at different frequencies using a variety of techniques is well known and well within the skill of the art. The signals received at the antenna are directed on a signal pathway to an IF amplifier 14 for amplification. The amplified signals are directed to a processor 18 where the signals are demodulated and otherwise processed. The processed signals are then directed to an output device 20.

Figure 7:
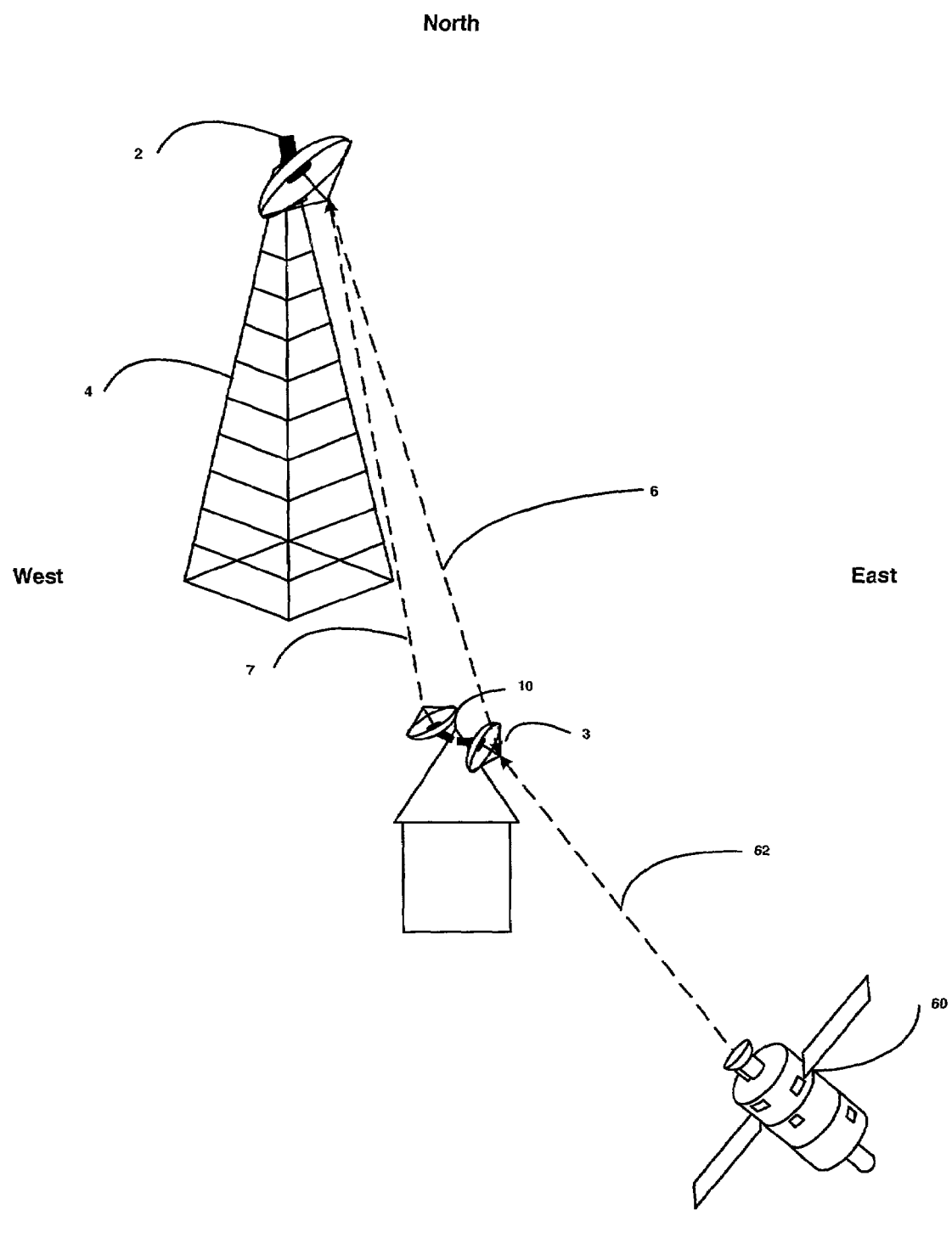
FIG. 7 is a schematic representation showing the positioning of a directional terrestrial antenna and a satellite transmitter in relation to the subscriber antenna at a subscriber location in accordance with one embodiment of the invention.
Figure 8:
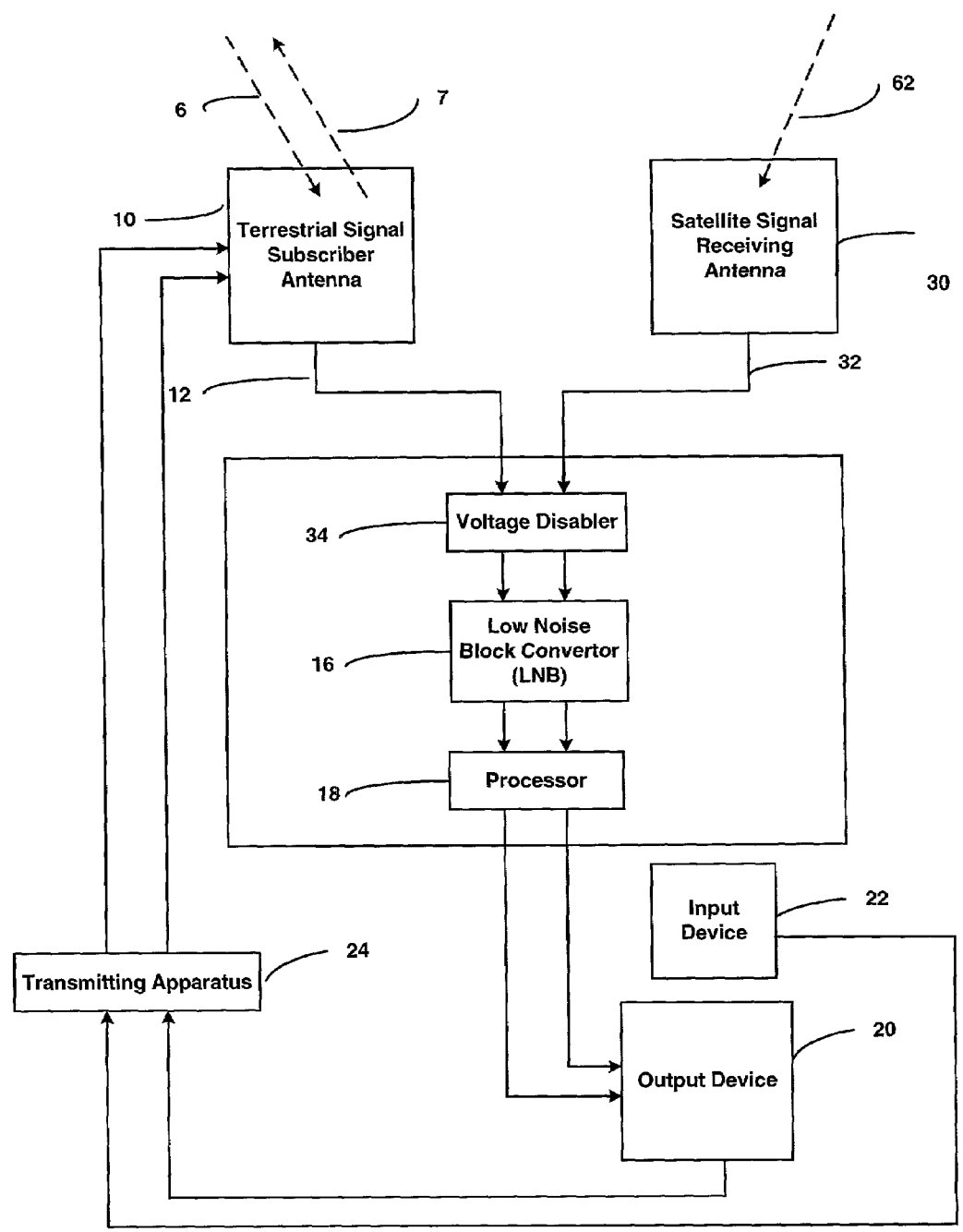
FIG. 8 is a schematic representation showing components of the apparatus associated with the subscriber antenna at a subscriber location in accordance with the embodiment of the invention described in FIG. 7.

FIGS. 7 and 8 illustrate the implementation of the invention described as system 4 in Table I. Referring to FIG. 7, a directional terrestrial antenna 2 situated on a supporting structure 4 transmits a terrestrial signal 6 to a subscriber antenna 10 at a subscriber location. The terrestrial antenna 2 is positioned so that the terrestrial signals 6 are transmitted in the generally southward direction. The subscriber antenna 10 is aligned in the northward direction to receive the terrestrial signals 6. The terrestrial signals 6 are transmitted at a first satellite-allocated frequency.

A satellite-based transmitter 60 transmits a satellite signal 62 to a second subscriber antenna 30 at the subscriber location. The satellite-based transmitter 60 transmits the satellite signals 62 in the northward direction. The first subscriber antenna 30 is aligned in the generally southward direction to receive the satellite signals 62. The satellite signals 62 are transmitted at the first satellite-allocated frequency.

Referring to FIG. 8, a first subscriber antenna 10 receives terrestrial signals 6 at a first satellite-allocated frequency from a terrestrial antenna 2. A second subscriber antenna 30 receives satellite signals 62 from a satellite-based transmitter 60. The satellite signals 62 are received at the same satellite-allocated frequency as the terrestrial signals 6. The terrestrial signals are directed by a first feed 12 to a voltage disabler 34. Likewise, satellite signals 62 are directed by a second feed 32 to the voltage disabler 34. The voltage disabler 34 is capable of supplying an electrical current to either the first feed 12 or the second feed 32. An electrical current will be applied to either the first feed 12 or the second feed 32 at any given time. The feed selected for the application of the electrical current is determined by an input in the input device 22 corresponding to a selection of a channel by the subscriber. Thus, the input device 22 is preprogrammed so that each channel corresponds to a feed to be disabled such that the signal provided by the other feed is subject to further processing. The feed which is not disabled provides the signals to the LNB 16 for amplification. The amplified signals are then directed to a processor 18 for demodulation or other processing. The processed signals are then provided to an output device 20. The output displayed, or otherwise provided, by the output device 20 thus corresponds to the channel selected by the subscriber. Moreover, the disabler mitigates the problems inherent in processing terrestrial signals and satellite signals received at the same frequency simultaneously.

Figure 9:
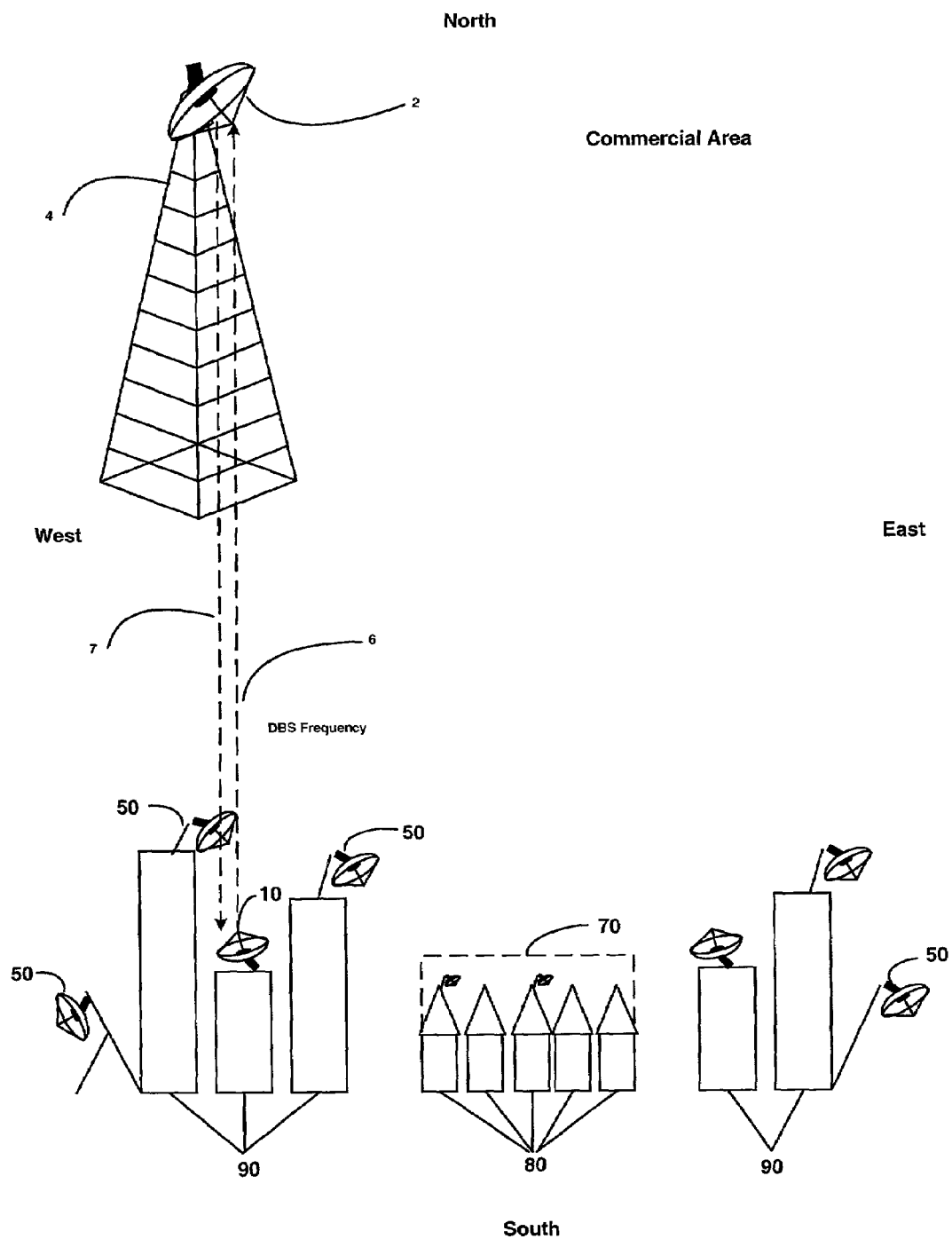
FIG. 9 is a schematic representation showing the positioning of a directional terrestrial antenna in relation to non-subscriber antennas, which receive satellite signals, in a commercial area, in accordance with an implementation of the invention.

Referring to FIG. 9, a directional terrestrial antenna 2 situated on a supporting structure 4 is located in a predominately commercial area. The commercial area contains commercial structures 90 in association with non-subscriber antenna 50 which receives satellite signals at a FSS frequency. In accordance with one implementation of the invention, a frequency other than a FSS frequency is transmitted from the directional terrestrial antenna 2. Optionally, an interference canceller 70 is placed in proximity to the non-subscriber antenna 50. In this manner, the terrestrial signals 6 transmitted from the directional terrestrial antenna 2 will not interfere with satellite signals received at the non-subscriber antenna 50 which are associated with the commercial structures 90 because the terrestrial signals 6 are transmitted at a different frequency than the signals being received at those sites. Further, at those non-subscriber antenna 50 which are associated with residential structures 80 are protected from interference by the terrestrial signals 6 being transmitted at the same frequency, by the interference canceller 70.

Figure 10:
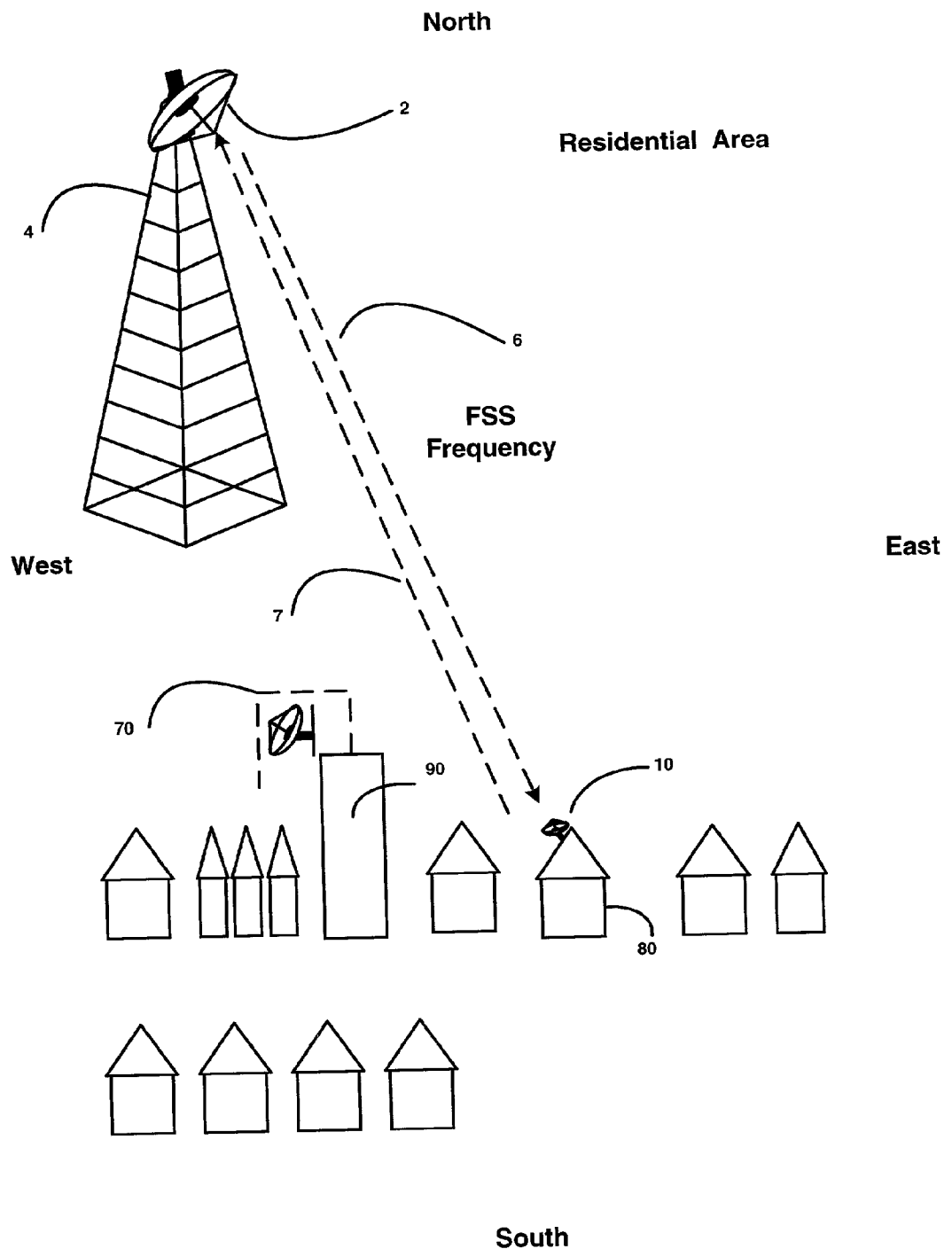
FIG. 10 is a schematic representation showing the positioning of a directional terrestrial antenna in relation to non-subscriber antennas, which receive satellite signals, in a residential area, in accordance with an implementation of the invention.

Referring to FIG. 10, a directional terrestrial antenna 2 on a supporting structure 4 transmits a terrestrial signal 6 at a frequency selected to mitigate interference with satellite signals being received by non-subscriber antenna associated with residential structures 80. For example, the terrestrial signals 6 are transmitted at a FSS frequency. In this manner, the non-subscriber antenna at the residential structure 80, which receives satellite signals at a DBS frequency, would not experience interference from the terrestrial signals 6 transmitted at the FSS frequency. Preferably, an interference canceller 70 is placed adjacent to or in proximity to a non-subscriber antenna associated with a commercial structure 90 to block the terrestrial signals 6 from reaching the non-subscriber antenna associated with the commercial structure 90. In this manner, the non-subscriber antenna 50 associated with the commercial structure 90 does not experience interference from the terrestrial signals at the FSS frequency, even though the non-subscriber antenna associated with the commercial structure 90 receives satellite signals at the same frequency as the terrestrial signals 6.

Figure 11:
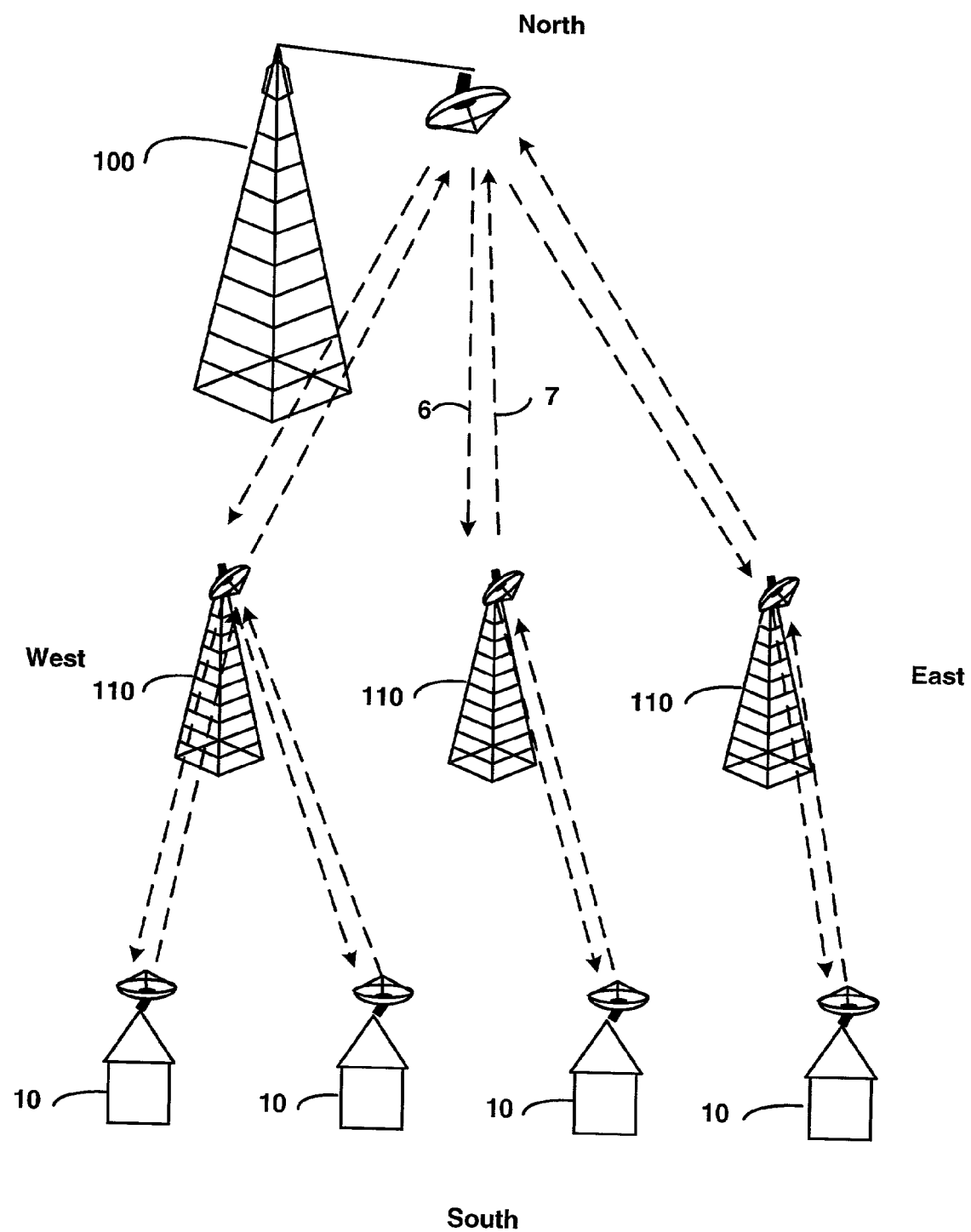
FIG. 11 is a schematic representation showing the positioning of primary directional terrestrial antennas at primary provider sites in relation to the positioning of secondary directional terrestrial antenna at secondary provider sites and subscriber antennas at subscriber locations, in accordance with an implementation of the present invention.

Referring to FIG. 11, a primary directional terrestrial antenna 100 is shown at a primary provider site. A plurality of secondary directional terrestrial antenna 110 are shown at a plurality of secondary provider sites. As shown in the figure, the relationship between the primary provider site and the secondary provider site may be a vertically integrated relationship, a horizontally integrated relationship, or, as actually shown in the drawing, a combination of both. The primary directional terrestrial antenna transmits terrestrial signals 6 to one or more of the secondary terrestrial antennas 110. The secondary terrestrial antennas 110 which receive the terrestrial signals 6 from the primary directional terrestrial antenna 100 then transmit the terrestrial signals 6 to one or more additional secondary directional terrestrial antennas 110. The secondary directional terrestrial antennas may be arranged in any manner. One or more of the secondary directional terrestrial antennas 110 transmits the terrestrial signals 6 received from either the primary directional terrestrial antenna and/or one or more of the secondary directional terrestrial antennas to one or more subscriber antennas 10 at a subscriber location. In this manner, a large number of subscribers may be reached using a directional terrestrial system which reuses satellite-allocated frequencies, in accordance with one implementation of the present invention. A person of ordinary skill in the art would understand that it would be possible to vary the arrangements of the primary provider site and the secondary provider site with one another and in relation to the subscriber locations to attain the desired effect.

The low-noise block converters (LNB) 16 and 17 of the present invention may be any conventional LNB. The use of LNBs in radio signal antennas is well known and well within the skill of the art. It would be appreciated by persons of ordinary skill in the art that an LNB could be modified for adaptation to the various embodiments of the present invention using readily available techniques and skills without undue experimentation.

The feeds for terrestrial signals and/or satellite signals may be any conventional feeds. The use of such feeds in radio signals receiving equipment is well known and well within the skill of the art. It would be appreciated by persons of ordinary skill in the art that a feed could be modified for adaptation to the various embodiments of the present invention using readily available techniques and skills without undue experimentation.

The processor 18 of the present invention may be any conventional processor, including conventional demodulators or other processing devices. The use of a wide variety of processors and demodulators is well known and well within the skill of the art. It would be appreciated by persons of ordinary skill in the art that processors and demodulators could be modified for adaptation to various embodiments of the present invention using readily available techniques and skills, without undue experimentation.

The output device 20 optionally includes or is operatively associated with a communications device or software for providing the subscriber with two-way communications capabilities, such as interactive television, for example, without limitation.

The output device 20 of the present invention may be any conventional output device. For example, the output device 20 of the invention may be a television, a computer, a radio, a video recorder/player, a handheld or portable wireless device, , and the like, or any combination thereof, without limitation. The use of such output devices in combination with radio signal receiving equipment is well known and well within the skill of the art. It would be appreciated by persons of ordinary skill in the art that an output device could be modified for adaptation to the various embodiments of the present invention using readily available techniques and skills without undue experimentation.

The input device 22 may be any device which allows the subscriber to input data to the receiving apparatus 26 or the transmitting apparatus 24. For example, the input device may be a channel selector, a computer/keyboard, a remote control device, a set top box, or any combination thereof, without limitation. The input device 24 may include, comprise or be operatively associated with a microprocessor and/or a software module. It would be appreciated by persons of ordinary skill in the art that an input device could be modified for adaptation to the various embodiments of the present invention using readily available techniques and skills without undue experimentation.

The transmitting apparatus 24 of the present invention may be any conventional apparatus for directing and/or processing inputs, including subscriber inputs, preprogrammed responses to received signals or the like, without limitation, for transmission by the subscriber antenna 10 from the subscriber location. The transmitting apparatus 24 may be operatively associated with the receiving apparatus 26, as illustrated in the Figures. Alternatively, the transmitting apparatus 24 may include the receiving apparatus 26, comprise the receiving apparatus 26 or be entirely independent of the receiving apparatus 26. It would be appreciated by persons of ordinary skill in the art that a transmitting apparatus could be modified for adaptation to the various embodiments of the present invention using readily available techniques and skills without undue experimentation.

Various receiving and/or transmitting antennas may be incorporated into the systems and methods of the present invention. The present invention contemplates having a single antenna at a subscriber location or provider site capable of receiving signals and transmitting signals. Also contemplated by the present invention is the use of separate antennas at the provider site and/or subscriber location for receiving and transmitting contemplated by the invention. Accordingly, each directional terrestrial antenna at the provider site and each subscriber antenna is independently a transmitting antenna, a receiving antenna or both.

For example, the subscriber antennamay be a circular wave guide antenna, feed-horn antenna, flat plate antenna, and/or slot antennawithout limitation. The subscriber antenna is preferably a parabolic reflector with an offset feed to reduce sidelobes and increase directivity in the desired direction. The directional terrestrial antenna, at the provider site, of the present invention may be any conventional directional terrestrial antenna. Directional terrestrial antennas are well known and well within the skill of the art. It would be well within the skill of the art to select and incorporate a directional terrestrial antenna appropriate for implementing each of the embodiments of the present invention, based upon the guidance provided herein.

Preferably, the directional terrestrial antenna at the provider site is a high-gain sector antenna. More preferably, the directional terrestrial antenna is a sectional horn having low sidelobes. Even more preferably, the directional terrestrial antenna is a high-gain sector antenna. Most preferably, the directional terrestrial antenna is a high-gain sector antennadesigned for low sidelobes in the elevation plane.

The beamwidth (in the azimuthal plane) of the antenna at the provider site is preferably about 120 degrees or less, and more preferably, about 100 degrees. In the vertical plane, the beamwidth of the antenna at the provider site is preferably about 20 degrees or less, and more preferably about 3 degrees.

In accordance with various embodiments and/or implementations of the present invention, it would be understood by persons of ordinary skill in the art that each provider site or subscriber location may have one antenna or a plurality of antennas. Each antenna may be the same or different, in any combination possible. Where one antenna is present at a provider site or a subscriber location, that antenna may both transmit and receive terrestrial signals. Where a plurality of antenna are present at a provider site or subscriber location, one or more of the antennas may transmit terrestrial signals and one or more of the antennas may receive terrestrial signals.

The present system is designed to be capable of co-existing as a secondary service with ubiquitously deployed DBS receivers in the 12.2-12.7 GHz band, according to an implementation. The deployment may be national in scope, encompassing urban, suburban and rural areas, with the general design parameters cited herein preferably optimized for each individual site.

The present system utilizes a low powered, cellular design, with transmitting antennas directing their radiation generally southward, into the backsides of DBS antennas, thereby providing the maximum isolation between the two systems. In areas where there will not be nearby DBS receivers, such as on water or in mountainous areas, the low power cellular approach can be modified to use higher transmitter powers. In areas where DBS receivers can be in close proximity to a provider site/directional terrestrial antenna, the vertical beamwidth of the directional terrestrial antenna, its height, tilt and sidelobe roll-off pattern, may be controlled in order to limit the PFD in the vicinity of the antenna.

Generally, each directional terrestrial antenna at a provider site will be directed in a southerly direction (e.g., at azimuths from 91 to 269 degrees), in order to illuminate only the back of co-channel receivers of other services. However, to minimize the necessity to mitigate interference and where local topography, zoning and property availability permit, the azimuth of transmissions at particular sites will be chosen to point towards the back of all the DBS antennas and as many as possible of the antennas of other protected services in that area.

In one implementation, the present invention uses methods developed via the FCC NPRM (IB Docket No. 00-248, Dec. 14, 2000), incorporated herein by reference, wherein a "mitigation zone" is defined around an antenna at a provider within which potentially harmful interference might be received by a DBS antenna. Each DBS receiver within the mitigation zone must then be examined to determine whether harmful interference is actually being received. The FCC proposes a "harmful interference criteria" of 2.86% increase in unavailability for each affected DBS receiver. These parameters establish the interference environment. Generally, line-of-sight conditions will dominate.

In accordance with various embodiments of the present invention, interference is optionally mitigated by utilizing relatively low effective isotropically radiated power (e.i.r.p.) terrestrial transmissions. The e.i.r.p. will generally be set at about the minimum value consistent with the service rules and with the goal of achieving availability of 99.7% at the maximum range, taking rain climatic zones into account. Accordingly, the margin may be as high as about 7 dB in areas of intense rainfall, and as little as 2 dB in regions of less intense rain. Power control may be used where necessary to control interference. Preferably, the directional terrestrial antenna transmits signals at an e.i.r.p. of no greater than about 15 dBW. More preferably, the directional terrestrial antenna transmits signals at an e.i.r.p. of no greater than about 10 dBW. Most preferably, the directional terrestrial antenna transmits signals at an e.i.r.p. of no greater than about 12.5 dBm.

In accordance with an implementation of the invention, satellite-allocated frequencies may be reused for terrestrial service by using relatively narrow beams with tightly controlled sidelobes, angular discrimination, frequency selection, inference mitigation and/or combinations thereof. Optionally, the directional terrestrial antenna at a provider site is positioned such that the antenna has a main access of radiation pointed generally southward. Further, the directional terrestrial antenna is optionally oriented 120 degrees in the azimuthal plane. In addition, the terrestrial antenna optionally has a linear polarization.

The height of the transmitting antennas at provider sites, in accordance with an implementation of the present invention, are based upon the height of the highest plane containing, or potentially containing, co-channel receivers of other services. A typical height would be about 100 meters. A minimum height of about 10 meters is preferable where there are no co-channel receivers of other services.

Transmitted signals, in accordance with an implementation of the present invention, will have a total bandwidth of about 500 MHz and will be composed of individual signal bandwidths ranging from about 24 MHz to about 500 MHz.

The subscriber antenna for receiving terrestrial signals in accordance with the present invention optionally includes various receiving characteristics for interference mitigation. For example, the subscriber antenna for receiving terrestrial signals optionally includes an offset-fed reflector. Preferably, the offset-fed reflector about 45 cm to about 60 cm. Further, the offset-fed reflector is optionally linearly polarized.

Interference to satellite signal receivers from terrestrial transmissions at satellite-allocated frequencies may be mitigated by utilizing adaptive interference cancellers (or "interference cancellers"). In particular, adaptive interference cancellers comprise an auxiliary receiving antenna pointed at a major source of interference. The receiving system of the canceller incorporates an adaptive filter which continuously adjusts its parameters to minimize the interfering signal in the output of the receiver of the satellite signal. Any conventional interference cancellers are contemplated by various embodiments of the present invention, as would be appreciated by persons of ordinary skill in the art. Based upon the guidance provided herein, persons of ordinary skill in the art would readily appreciate the various ways in which interference cancellers could be utilized implement the present invention.

A substantial advantage of the present invention over broadcasting or other communication systems includes the ability to provide, through one service, national television programming, regional television programming and local television programming, as well as any other video programming and/or data, including broadband data. Thus, the present invention represents a comprehensive communications system. Moreover, the system, apparatus and method of the present invention may be utilized to provide consumers with data transmission services and Internet services, in addition to single-channel or multi-channel video programming, without limitation. Additionally, the present invention enables at least a full 1 GHz of service to be provided to subscribers. This capability provides a number of benefits, including the ability to use lower power levels, so as to interfere less with satellite signals while maintaining high data rates, as well as a comprehensive communication system, without limitation.

Two-way communication may be provided by the system, apparatus and method of the present invention. The two-way communication provided by the present invention allows subscribers to optionally transmit signals to the service provider, in accordance with various implementations of the present invention. For example, in one implementation of the present invention, a satellite uplink frequency is utilized as a return path for the terrestrial service, by having the subscriber antenna at a subscriber location transmit terrestrial signals back to the provider site where it would be received on an antenna and processed by a receiving system. As described above, the terrestrialantenna at the provider site is aligned in the northward direction.

It will be appreciated by persons or ordinary skill in the art that terrestrial reuse of satellite downlink frequencies relies on the fact that the satellite-based transmitters generally transmit signals from south to north, while the terrestrial transmitters generally transmit from north to south. For example, Interference to and from subscribers using a DBS feeder link band for a return path would be extremely unlikely for two reasons: there are only two, or at most a few DBS feeder link stations in the United States, and they are located in areas of sparse population. Consequently, the transmissions from those stations would not interfere with the receivers at the transmitting and receiving site of the terrestrial service provider. Similarly, since all of the antennas of the Northern Hemisphere subscribers' low-power return paths would be pointing north, none of them could interfere with the receiver on board a DBS satellite located in the Earth's equatorial plane, even if tuned to the same frequencies. In this manner, various two-way systems may be provided to consumers whereby consumers communicate with the service provider.

It is contemplated that two-waycommunications services, including television, such as interactive television, and Internet or other data communications service, and the like, without limitation, are optionally provided in accordance with various implementations of the present invention. For example, in one implementation of the invention, a subscriber may request specific programming or data from the provider by requesting the desired programming or data by transmitting signals with the request to the provider. In another implementation of the present invention, for example, the provider, either automatically or by arrangement, receives signals from the subscriber regarding the programming being viewed or data being received to compile information regarding viewer-ship or user-ship for commercial purposes, such as market research. In another implementation of the present invention, for example, the subscriber transmits data to the provider regarding subscribing to the service, extending subscription and/or payment for service. In another implementation of the present invention, the subscriber is able to engage in transactions by transmitting signals to the provider, for example, without limitation.

It would be clear to persons of ordinary skill in the art as to the manner for providing any variations of subscriber interaction in accordance with various embodiments and implementations of the present invention, based upon the guidance provided herein.

In the case of providing Internet service to subscribers in accordance with the present invention, the Internet service is preferably a high-speed broadband service. More preferably, the Internet service is a high-speed broadband service having an information bit rate from about 1.554 MB/s up to about 40 Mb/s per channel. The Internet service and video programming may be combined in any manner, in accordance with various embodiments and implementations of the present invention. For example, the Internet service may be accessed via a television system, without limitation.

The various embodiments of the present invention may further include a portable or wireless communications device, such as a handheld device or a vehicle installed device, without limitation, which contains a transmitter and/or receiver operatively associated with the subscriber location. In this manner, a subscriber may receive signals from and/or transmit signals to the provider, even when no longer at the subscriber location. It would be well within the skill of the art to select the proper components to implement such a system in conjunction with the various embodiments of the present invention described above, based upon the guidance provided herein.

The following example is illustrative of preferred embodiments of the inventive subject matter and are not to be construed as limiting the inventive subject matter thereto.

EXAMPLE 1

A system in accordance with an implementation of the present invention is designed according to the following parameters:

| System Parameters | |
|---|---|
| Frequency, GHz | 12.2-12.7 |
| Transmit Bandwidth, Mhz | 500 |
| Modulation | QPSK |
| Peak transmitting e.i.r.p., dBm | 12.5 |
| Transmitting Antenna Azimuth | Generally southward. (Where feasible the azimuth will be the average of the extreme azimuths of the DBS antennas in that region) |
| Transmit Antenna Vert. Beamwidth, deg | 16 |
| Transmit Antenna Hor. Beamwidth, deg | 110 |
| Transmit Antenna Height, meters | 100 |
| Tilt (measured upward), deg | 0 |
| Pattern Roll-off | Inversely as the square of the normalized beamwidth |
| Range | 15 Km |
| Receive Antenna Gain, dBi | 34 |
| Receive Antenna Noise Temp. clear sky, K | 100 |

With regard to the vertical beamwidth of 16 degrees, the on-axis PFD in the plane 100 meters below the antenna at the provider site is controlled out to the 3 dB point, approximately 700 meters. Therefore, the measured PFD will be essentially constant from 700 meters to 0 meters (at the antenna mast). Reducing the vertical beamwidth will extend the region of PFD control, if necessary.

The Transmit Antenna Height refers to the height above DBS receivers, or potential DBS receivers, in the vicinity of the antenna at the provider site.

The invention now being fully described, it will be apparent to one of ordinary skill in the art that many changes and modifications can be made thereto without departing from the spirit or scope of the invention as set forth herein. The foregoing describes the preferred embodiments of the present invention along with a number of possible alternatives. These embodiments, however, are merely for example and the invention is not restricted thereto. The present invention is therefore not restricted to the embodiments disclosed above, but is defined in the following claims.

What is claimed is:

1. A single-channel or multi-channel system for receiving terrestrial signals at a provider site from a subscriber, which comprises:
    a first directional subscriber antenna at a subscriber location with a main axis directed northward for transmitting the terrestrial signals to the provider site at a satellite-allocated frequency selected from a range of frequencies including: 11.7-12.2 GHz, 17.3-17.8 GHz and 41.0-42.5 GHz, and the satellite-allocated frequency is selected so as to mitigate interference with non-terrestrial signals;
    a directional terrestrial antenna at the provider site with a main axis directed southward for receiving the terrestrial signals at the selected frequency, wherein the directional subscriber antenna and the directional terrestrial antenna are aligned to mitigate interference with non-terrestrial signals; a second subscriber antenna at the subscriber location for receiving satellite signals at a second satellite allocated frequency from a satellite based transmitter, wherein the second subscriber antenna and the satellite based transmitter are aligned in a second axis to mitigate interference with the first satellite-allocated frequency;
    a plurality of proximal non-subscriber antennas, each with a main axis directed in a direction to avoid interference with the directional terrestrial antenna at the provider site; and
    processing means at the provider site for processing the terrestrial signals into an output.

2. The single-channel or multi-channel system of claim 1, further comprising means for transmitting terrestrial signals from the directional terrestrial antenna to the subscriber.

3. The single-channel or multi-channel system of claim 1, wherein said single-channel or multi-channel system provides the subscriber with interactive television.

4. A single-channel or multi-channel system for receiving terrestrial signals at a provider site from a subscriber, which comprises:
    a first subscriber antenna at a subscriber location for transmitting the terrestrial signals at a satellite-allocated frequency selected from a range of frequencies including: 17.3-17.8 GHz and 41.0-42.5 GHz, to the provider site;
    a directional terrestrial antenna at the provider site for receiving the terrestrial signals from the subscriber at the satellite-allocated frequency; said subscriber antenna and said directional terrestrial antenna being aligned in a first axis to mitigate interference with satellite signals; a second subscriber antenna at the subscriber location for receiving satellite signals at a second satellite allocated frequency from a satellite based transmitter, wherein the second subscriber antenna and the satellite based transmitter are aligned in a second axis to mitigate interference with the first satellite-allocated frequency, and wherein the first axis is different from the second axis; a plurality of proximal non-subscriber antennas, each with a main axis directed in a direction to avoid interference with the directional terrestrial antenna at the provider site; and
    processing means at the provider site for processing the terrestrial signals into an output.

5. The single-channel or multi-channel system of claim 4, further comprising means for transmitting terrestrial signals from the directional terrestrial antenna to the subscriber.

6. The single-channel or multi-channel system of claim 4, wherein said single-channel or multi-channel system provides the subscriber with interactive television.

7. A single-channel or multi-channel system for receiving terrestrial signals at a provider site from a subscriber, which comprises:
    a first subscriber antenna with a main axis of radiation directed northward at a subscriber location for transmitting and receiving terrestrial signals to and from the provider site at a first satellite-allocated frequency selected from a range of frequencies including: 11.7-12.2 GHz, 17.3-17.8 GHz and 41.0-42.5 GHz;
    a directional terrestrial antenna at the provider site for receiving and transmitting terrestrial signals at the first satellite-allocated frequency, wherein the directional terrestrial antenna and the subscriber antenna are aligned in a first axis;
    a second subscriber antenna at the subscriber location for receiving satellite signals at a second satellite allocated frequency from a satellite based transmitter wherein the second subscriber antenna and the satellite based transmitter are aligned in a second axis to mitigate interference with the first satellite-allocated frequency;
    wherein the second satellite-allocated frequency is different from the first satellite-allocated frequency and the first axis is different from the second axis; and
    processing means at the provider site for processing said terrestrial signals into an output.

8. The single-channel or multi-channel system of claim 7, further comprising means for transmitting terrestrial signals from the directional terrestrial antenna to the subscriber.

9. The single-channel or multi-channel system of claim 7, wherein said single-channel or multi-channel system provides the subscriber with interactive television.

10. A single-channel or multi-channel system for transmitting terrestrial signals from a primary provider site to a plurality of secondary provider sites, which comprises:
    a primary directional terrestrial antenna at the primary provider site aligned in a first axis for transmitting terrestrial signals at a satellite-allocated frequency to the plurality of secondary provider sites;
    a secondary directional terrestrial antenna at each of the secondary provider sites aligned in a second axis, wherein the second axis is different from the first axis, for receiving the terrestrial signals at the satellite-allocated frequency from the primary directional terrestrial antenna, said primary directional terrestrial antenna and each of said secondary directional terrestrial antennas being aligned to mitigate interference with satellite signals; and
    a plurality of subscriber antennas for receiving the terrestrial signals from the primary directional antennas and one or more of the secondary directional terrestrial antennas, at a plurality of subscriber locations;
    wherein the satellite-allocated frequency is reused by the one or more of the primary directional terrestrial antenna and the secondary directional terrestrial antenna and is selected from a range of frequencies consisting of: 11.7-12.2 GHz, 17.3-17.8 GHz or 41.0-42.5 GHz.

11. The single-channel or multi-channel system of claim 10, further comprising one or more additional secondary directional terrestrial antenna at one or more additional secondary provider sites.

12. The single-channel or multi-channel system of claim 11, wherein the terrestrial signals are transmitted from the secondary directional terrestrial antenna to the one or more additional secondary directional terrestrial antenna at one or more additional secondary provider sites.

13. The single-channel or multi-channel system of claim 10, further comprising a subscriber antenna at a subscriber location for receiving the terrestrial signals from the secondary directional terrestrial antenna.

14. The single-channel or multi-channel system of claim 10, further comprising: one or more additional secondary directional terrestrial antenna at one or more additional secondary provider sites; and a subscriber antenna at a subscriber location for receiving the terrestrial signals from the one or more additional secondary directional terrestrial antenna.

15. The single-channel or multi-channel system of claim 14, wherein the terrestrial signals are received at the subscriber location after being directly or indirectly transmitted from the secondary directional terrestrial antenna to one or more additional secondary directional terrestrial antenna.

16. A method for receiving terrestrial signals from a subscriber at a provider site, comprising:
transmitting to the provider site from a first directional subscriber antenna at a subscriber location the terrestrial signals at a satellite-allocated frequency selected from a range of frequencies consisting of: frequencies including: 11.7-12.2 GHz, 17.3-17.8 GHz and 41.0-42.5 GHz, and the satellite-allocated frequency is selected so as to mitigate interference with non-terrestrial signals;
receiving at a directional terrestrial antenna at the provider site the terrestrial signals at the selected satellite-allocated frequency, wherein the directional subscriber antenna has a main axis directed northward and the directional terrestrial antenna has a main axis directed southward and wherein the directional subscriber antenna and the directional terrestrial antenna are aligned to mitigate interference with non-terrestrial signals; receiving at a second subscriber antenna at the subscriber location satellite signals at a second satellite allocated frequency from a satellite based transmitter, wherein the second subscriber antenna and the satellite based transmitter are aligned in a second axis to mitigate interference with the first satellite-allocated frequency;
positioning a plurality of proximal non-subscriber antennas in a direction to avoid interference with the directional terrestrial antenna at the provider side; and
processing at the provider site the terrestrial signals into an output.

17. The method of claim 16, further comprising transmitting terrestrial signals from the directional terrestrial antenna to the subscriber.

18. The method of claim 16, wherein said method provides the subscriber with interactive television.

19. A method for receiving terrestrial signals from a subscriber at a provider site, comprising:
transmitting to the provider site from a first subscriber antenna at a subscriber location terrestrial signals at a satellite-allocated frequency selected from a range of frequencies including: 17.3-17.8 GHz and 41.0-42.5 GHz;
receiving at a directional terrestrial antenna at the provider site the terrestrial signals from the subscriber at the selected satellite-allocated frequency; said subscriber antenna and said receiving at a second subscriber antenna at the subscriber location satellite signals at a second satellite allocated frequency from a satellite based transmitter, wherein the second subscriber antenna and the satellite based transmitter are aligned in a second axis to mitigate interference with the first satellite-allocated frequency, and wherein the first axis is different from the second axis; positioning a plurality of proximal non-subscriber antennas in a direction to avoid interference with the directional terrestrial antenna at the provider site; and
processing means for processing the terrestrial signals into an output.

20. The method of claim 19, further comprising transmitting terrestrial signals from the directional terrestrial antenna to the subscriber.

21. The method of claim 19, wherein said method provides the subscriber with interactive television.

22. A method for receiving terrestrial signals from a subscriber at a provider site, comprising:
transmitting from a first subscriber antenna with a main axis of radiation directed northward at a subscriber location to a provider site terrestrial signals at a first satellite-frequencies including: 11.7-12.2 GHz, 17.3-17.8 GHz and 41.0-42.5 GHz; allocated frequency selected from a range of frequencies consisting of: frequencies including: 11.7-12.2 GHz, 17.3-17.8 GHz and 41.0-42.5 GHz;
receiving at a directional terrestrial antenna at the provider site terrestrial signals at the first satellite-allocated frequency, wherein the directional terrestrial antenna and the subscriber antenna are aligned in a first axis;
receiving at a second subscriber antenna at the subscriber location satellite signals at a second satellite allocated frequency from a satellite based transmitter, wherein the second subscriber antenna and the satellite based transmitter are aligned in a second axis to mitigate interference with the first satellite-allocated frequency; wherein the second satellite-allocated frequency is different from the first satellite-allocated frequency and the first axis is different from the second axis; and
processing means at the provider site for processing said terrestrial signals into an output.

23. The method of claim 22, further comprising transmitting terrestrial signals from the directional terrestrial antenna to the subscriber.

24. The method of claim 22, wherein said method provides the subscriber with interactive television.

25. A method for transmitting terrestrial signals from a primary provider site to a plurality of secondary provider sites, which comprises:
transmitting from a primary directional terrestrial antenna at the primary provider site to the plurality of secondary provider sites the terrestrial signals at a satellite-allocated frequency;
receiving from the primary directional terrestrial antenna at a secondary directional terrestrial antenna at each of the secondary provider sites the terrestrial signals at the satellite-allocated frequency, said primary directional terrestrial antenna and each of said secondary directional terrestrial antennas being aligned to mitigate interference with satellite signals; and receiving from a plurality of subscriber antennas the terrestrial signals from the primary directional antennas and one or more of the secondary directional terrestrial antennas, at a plurality of subscriber locations;

wherein the satellite-allocated frequency is selected from a range of frequencies including: 11.7-12.2 GHz, 17.3-17.8 GHz and 41.0-42.5 GHz, and is reused by the one or more of the primary directional terrestrial antenna and the secondary directional terrestrial antenna.

26. The method of claim 25, further comprising transmitting the terrestrial signals from the secondary directional terrestrial antenna to one or more additional secondary directional terrestrial antenna at one or more additional secondary provider sites.

27. The method of claim 25, further comprising transmitting the terrestrial signals from the secondary directional terrestrial antenna to a subscriber antenna at a subscriber location.

28. The method of claim 25, further comprising: transmitting the terrestrial signals to one or more additional secondary directional terrestrial antenna at one or more additional secondary provider sites from the secondary directional terrestrial antenna; and transmitting to the subscriber location from the one or more additional secondary directional terrestrial antenna the terrestrial signals.

29. The method of claim 28, wherein the terrestrial signals are received at the subscriber location after being directly or indirectly transmitted from the secondary directional terrestrial antenna to one or more additional secondary directional terrestrial antenna.

30. The method of claim 29, wherein terrestrial signals are transmitted from a subscriber antenna at a subscriber location to the secondary directional terrestrial antenna or the one or more additional secondary directional terrestrial antenna.

31. The method of claim 25, wherein terrestrial signals are transmitted from the secondary directional terrestrial antenna to the primary directional terrestrial antenna.

* * * * *